United States Patent [19]

Fujikura et al.

[11] Patent Number: 4,901,313
[45] Date of Patent: Feb. 13, 1990

[54] A-POINT TO MULTI-POINTS COMMUNICATION SYSTEM

[75] Inventors: Nobuyuki Fujikura, Kodaira; Hiroshi Morita, Yokohama; Yoshihisa Ikeda, Ibaraki; Ryoichi Sasaki, Fujisawa, all of Japan

[73] Assignees: Hitachi, Ltd.; Hitachi Microcomputer Engineering Ltd., both of Tokyo, Japan

[21] Appl. No.: 224,727

[22] Filed: Jul. 27, 1988

[30] Foreign Application Priority Data

May 11, 1987 [JP] Japan .................. 62-114276

[51] Int. Cl.$^4$ .................. H04J 3/06; H04J 3/16
[52] U.S. Cl. .................. 370/104.1; 370/95.1
[58] Field of Search .................. 370/104, 95, 13, 17, 370/94, 940, 85; 371/32, 33

[56] References Cited

U.S. PATENT DOCUMENTS

| | | | |
|---|---|---|---|
| 4,617,657 | 10/1986 | Drynan et al. | 370/94 |
| 4,689,785 | 8/1987 | Toyonaga et al. | 370/94 |
| 4,725,834 | 2/1988 | Chang et al. | 370/85 |
| 4,736,371 | 4/1988 | Tejima et al. | 370/94 |
| 4,760,572 | 7/1988 | Tomikawa | 370/94 |

FOREIGN PATENT DOCUMENTS

| | | |
|---|---|---|
| 60-85631 | 5/1985 | Japan . |
| 60-173993 | 9/1985 | Japan . |
| 60-251727 | 12/1985 | Japan . |
| 61-84140 | 4/1986 | Japan . |

OTHER PUBLICATIONS

Transaction of Information Processing Society of Japan, vol. 27, No. 4, Apr. 1986, pp. 462–470.
Review of the Radio Research Laboratory, vol. 32, No. 163, Jun. 1986, pp. 153–163.

Primary Examiner—Benedict V. Safourek
Assistant Examiner—Wellington Chin
Attorney, Agent, or Firm—Antonelli, Terry & Wands

[57] ABSTRACT

In order to improve the throughput of an a-point to multi-points information system having a master station for transmitting an a-point to multi-points frame and a plurality of slave stations for receiving the a-point to multi-points frame and to insure reliability of received information, the master station comprises a unit for detecting that the number of slave stations which are in abnormal receiving of an a-point to multi-points frame from the master station exceeds a predetermined value, and retransmits the a-point to multi-points frame received abnormally during the detection. When the slave stations are divided into a plurality of groups, the master station comprises a unit for detecting that the number of slave stations in each group which are in abnormal receiving of an a-point to multi-points frame from the master station exceeds a value which is predetermined for each group, and retransmits the a-point to multi-points frame after temporarily disconnecting slave stations in a detected group from the object to which the a-point to multi-points frame is transmitted from the master station.

32 Claims, 14 Drawing Sheets

FIG. 14

| 71 - ① | 72 - ① |
|---|---|
| 71 - ② | 72 - ② |
| 71 - ③ | 72 - ③ |
| ⋮ | ⋮ |
| 71 - ⓝ | 72 - ⓝ |
| 71 - (n+1) | 72 - (n+1) |

A-POINT TO MULTI-POINTS COMMUNICATION SYSTEM

BACKGROUND OF THE INVENTION

This invention relates to a-point to multi-points communication systems and more particularly to an a-point to multi-points communication system suitable for improving efficiency of communication.

A prior art a-point to multi-points communication control scheme generally adopted in the field of radio communication is disclosed in, for example, JP-A-60-85631 and in this scheme, a-point to multi-points information or broadcast information is transmitted only unidirectionally from a transmitting station to receiving stations and no response is transmitted from the receiving stations to the transmitting station. This prior art scheme is applicable to a case where satisfactory quality of link can be insured and error rate of information can be so small that error of information is not problematic in operation. For example, this is the case where information of high redundancy such as video information in TV broadcasting is handled. Adopted in digital communication is a similar scheme in which error control information is added and an arrangement for information error detection and error correction is additionally provided for the sake of reducing error rate of information.

In the field of cable communication, in addition to a similar scheme to that for radio communication, a known a-point to multi-points communication control scheme as disclosed in JP-A-60-173993 has sometimes been adopted wherein in a-point to multi-points communication, responses from receiving stations to a transmitting station are transmitted on the time division basis. There is also available an a-point to multi-points communication control scheme as disclosed in JP-A-61-84140 wherein a transmitting station dedicated to a-point to multi-points communication is provided and this transmitting station fills the role of a different station (a-point to multi-points communication request station) in carrying out a-point to multi-points communication controlling.

As will be seen from the foregoing, in the prior art a-point to multi-points communication systems, an a-point to multi-points frame is transmitted from a station, that is, a master station and all of stations receiving the a-point to multi-points frame from the master station, that is, slave stations respond to the (1) Transmitting no response frame.

(2) Transmitting a response frame each time the a-point to multi-points frame is received.

With the mode (1), reliability of information in each slave station can not always be insured. With the mode (2), on the other hand, in the event that abnormal receiving in a slave station leads to occurrence of retransmission, the slave station is not permitted to receive the next a-point to multi-points frame (taking a control scheme wherein frames can be transmitted successively within a stipulated number of frames without waiting for a response, for instance, a subsequent permissible successive transmission frame) until the master station completes the retransmission processing, thereby raising a fatal problem that the throughput of the a-point to multi-points communication system as a whole is degraded. As the number of slave stations increases, the frequency of occurrence of retransmission increases and the master station undertakes an increase in overhead of processing for reception of response frames, with the result that the above problem is aggravated to further degrade the throughput of the entire a-point to multi-points communication system.

As a countermeasure, a scheme has been proposed wherein in contrast to the scheme described in the aforementioned JP-A-61-84140, a representative receiving station is provided and slave stations other than the representative receiving station tap a-point to multi-points information which is being received by the representative receiving station, as disclosed in (A): "Proposal and Evaluation of Simplified High-reliability Broadcast Protocol for High-efficiency Transmission of a Large Amount of Data", Transactions of Information Processing Society of Japan, Vol. 27, No. 4, April, 1986, pp. 462–470.

Another scheme has also been proposed wherein each slave station does not normally make a response to a master station but only when receiving a request for response from the master station, a slave station in question or of interest transmits a response to the master station, as disclosed in (B): "Control Procedure of Data Link for Satellite Link", REVIEW OF THE RADIO RESEARCH LABORATORY, Vol. 32, No. 163, June, 1986, pp. 153–163.

The scheme described in the above (A) can insure reliability of information received by individual slave stations other than the representative receiving station if quality is uniform over individual links between the master and the individual slave stations but disadvantageously, can not insure reliability of information received by individual slave stations in a system in which the quality of link is irregular. In the scheme described in the above (B), timing for the master station to request each slave station to make a response is not clarified and a slave station of interest will not transmit a response indicative of normal receiving, thus preventing the master station from grasping the receiving state of each slave station. This impairs reliability of information in the a-point to multi-points communication system.

SUMMARY OF THE INVENTION

The present invention has been achieved in view of the background described previously and has for its object to solve the aforementioned problems faced by the prior art a-point to multi-points communication systems and improve the throughput of a-point to multi-points communication system.

Another object of this invention is to provide an a-point to multi-points communication system capable of insuring reliability of a-point to multi-points information.

According to the invention, to accomplish the above object, in an a-point to multi-points communication system constituted by a master station for transmitting an a-point to multi-points message in the form of a single a-point to multi-points frame or a plurality of a-point to multi-points frames and a plurality of slave stations for receiving the a-point to multi-points message, there are provided principal means as follows.

In the master station, the following means are provided:

(1) means for detecting that the number of slave stations which transmit a response frame including information indicative of abnormal receiving of an a-point to multi-points frame of the same send sequence number from the master station exceeds a predetermined value;

(2) means for detecting that the number of slave stations which transmit a response frame including information indicative of normal receiving of an a-point to multi-points frame of the same send sequence number from the master station is below a predetermined value; and (3) means for detecting that the number of slave stations which transmit a frame for requesting retransmission of an a-point to multi-points frame of the same send sequence number from the master station exceeds a predetermined value.

On the other hand, the following means is provided in each slave station:

(4) means for defining a first value (X) which is common to all of the slave stations and a second value (Yi where Yi<X) corresponding to individual slave stations i, dividing, each time a slave station of interest receives an a-point to multi-points frame from the master station, a send sequence number $N_s$ assigned to the a-point to multi-points frame by the first value X and causing the slave station in question to prepare and transmit a response frame only when a residue of the division coincides with the second value Yi.

The values X and Yi described herein may be determined independently of addresses, to be described later, of the individual slave stations. The number of slave stations having the same value Yi may desirably be set in accordance with the scale of the system or the total number of slave stations.

When obtaining detection results from the detecting means (1) to (3), the master station retransmits the corresponding a-point to multi-points frame. When the master station transmits the a-point to multi-points frame and detects, at the lapse of predetermined time after the transmission of the a-point to multi-points frame, that the number of slave stations which transmit a response frame including information indicative of normal receiving or abnormal receiving of the a-point to multi-points frame is below a predetermined value, it transmits a frame for requesting a response.

When the slave stations are divided into a plurality of groups, the means (1) to (3) are applied to each group and a group in which the frequency of retransmission of a-point to multi-points frame is high is excluded from the object for which the transmission of the a-point to multi-points frame is controlled. The a-point to multi-points frame assigned with an address of the precluded group is retransmitted to individual slave stations in the precluded group after transmission of a series of a-point to multi-points messages to individual slave stations in the other groups has been completed.

On the other hand, each time a slave station receives an a-point to multi-points frame, the slave station stores the received a-point to multi-points frame and its receiving state (representative of normal receiving or abnormal receiving of the frame). When detecting the loss of an a-point to multi-points frame of a different send sequence number on the basis of the send sequence number assigned to the received a-point to multi-points frame, the slave station stores the receiving state corresponding to the lost a-point to multi-points frame as an abnormal receiving state and transmits a frame for requesting retransmission of that a-point to multi-points frame.

When a slave station is caused by the means (4) to prepare and transmit a response frame, the slave station collectively inserts, into the response frame, information indicative of receiving states for received a-point to multi-points frames including a series of send sequence numbers lying between a send sequence number, subsequent to a send sequence number to be assigned to the latest received a-point to multi-points frame in response to which the slave station has transmitted a response frame previously, and a send sequence number assigned to the latest received a-point to multi-points frame in response to which the slave station presently decides to transmit a response frame.

When an address assigned to an a-point to multi-points frame received by individual slave stations is a global address purporting that the a-point to multi-points frame should be received by all of the slave stations or coincides with a group address to which the individual slave stations belong, the individual slave stations make the a-point to multi-points frame valid.

Grouping of the slave stations is determined depending on the scale and the manner of operation of the system, and all of the slave stations may be defined as one group.

BRIEF DESCRIPTION OF THE DRAWINGS

FIG. 14 shows a priority table stored in a memory.

DESCRIPTION OF THE PREFERRED EMBODIMENTS

Figure 1:
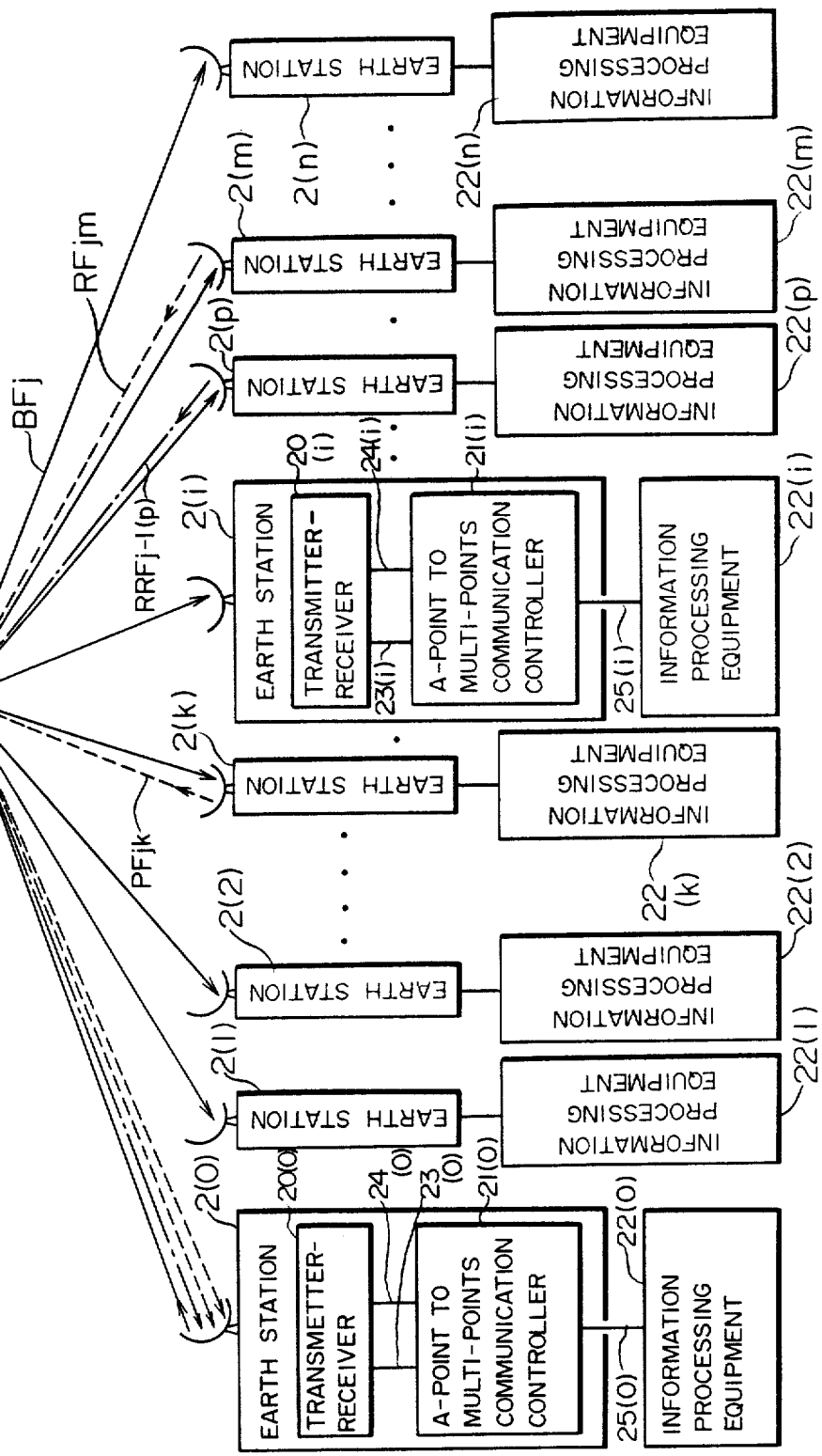
FIG. 1 is a schematic diagram illustrating an embodiment of a satellite a-point to multi-points communication system of the invention.

Referring now to FIG. 1, there is schematically illustrated an embodiment of a satellite a-point to multi-points communication system utilizing a satellite. As shown, each earth station 2(i), where i=0 to n, comprises a transmitter-receiver 20(i) and an a-point to multi-points communication controller 21(i). Each earth station 2(i) is connected to an information processing equipment 22(i) such as a computer or a terminal adapted to process a-point to multi-points information (a-point to multi-points message).

Consider an instance where an earth station 2(0) is assumed to be a master station and an a-point to multi-points frame which is prepared by an a-point to multi-points communication controller 21(0) on the basis of a message prepared by an equipment 22(0) is transmitted through a transmitter-receiver 20(0). Each of the earth stations 2(1), 2(2), ---, 2(i), ---, 2(n) represents a slave station which receives the a-point to multi-points frame from the master station 2(0) through a satellite 1 and the transmitter-receiver 20(i), where i=1 to n, which prepares a response frame to the a-point to multi-points frame at the a-point to multi-points communication controller 21(i) and which transmits the response frame through the transmitter-receiver 20(i). Each slave station synthesizes a message from the received a-point to multi-points frame and sends the message to the equipment 22(i).

In FIG. 1, a link for an a-point to multi-points frame is depicted by a solid line, a link for a response frame by a dashed line and a link for a retransmission request frame by a chained line. Particularly, FIG. 1 is illustrative of a status covering an appreciable time width and in which slave stations points frame $BF_j$ to transmit response frames $RF_j(k)$ and $RF_j(m)$, respectively, and a slave station 2(p) is responsive to an a-point to multi-points frame $BF_{j-1}$ to transmit a retransmission request frame $RRF_{j-1}(p)$.

The status shown in FIG. 1 takes place as a result of operation to be outlined below. Where a send sequence number assigned to the a-point to multi-points frame $BF_j$ is $N_{sj}$, a value defined in common to all of the slave stations is X and a value defined corresponding to individual slave stations is $Y_i$ (it is not always necessary that $Y_i$ be unique to individual slave stations), each slave station is permitted to transmit a response frame when the following equation stands:

$$Y_i = MOD(N_{sj}, X) \quad (1)$$

where MOD (a, b) is a function representative of a residue obtained when a is divided by b.

Thus, it is meant by the transmission of response frames from the slave stations 2(k) and 2(m) as shown in FIG. 1 that $$Y_k = Y_m \quad (2)$$

$$N_{sj} = uX + Y_k \quad (3)$$

where u is an arbitrary non-negative integer, are valid.

The slave station 2(p) shown in FIG. 1 recognizes, by receiving the current a-point to multi-points frame $BF_j$, that it has not received the previous a-point to multi-points frame $BF_{j-1}$, and transmits the retransmission request frame $RRF_{j-1}(p)$.

Figure 2:
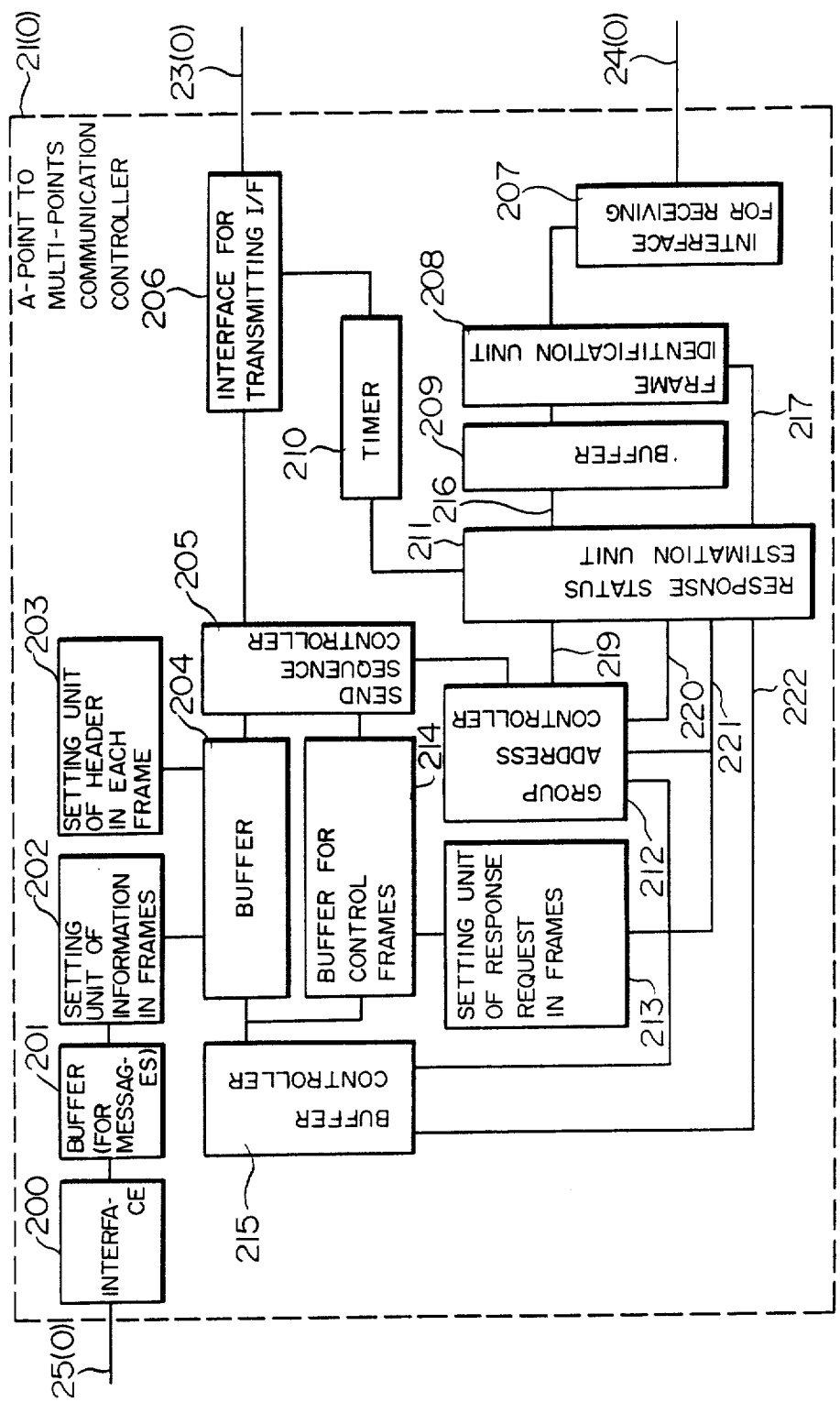
FIG. 2 is a block diagram schematically illustrating an a-point to multi-points communication controller included in a master station in the FIG. 1 satellite a-point to multi-points communication system.

An example of construction of the a-point to multi-points communication controller 21(0) included in the master station 2(0) is illustrated in FIG. 2. Referring to FIG. 2, the a-point to multi-points communication controller 21(0) comprises a transmitting system and a receiving system. The transmitting system includes an interface 200 for receiving through a signal line 25(0) an a-point to multi-points transmission message from the equipment 22(0) such as a computer or a terminal adapted to prepare a-point to multi-points information, a buffer 201 for storing the transmission message, a unit 202 of setting information in frames which decomposes the a-point to multi-points transmission message into frames being each a bit string of a fixed length and stores the frames in a buffer 204, a unit 203 of setting header in each frame which inserts a header such as a send sequence number into each a-point to multi-points frame stored in the buffer 204, a send sequence controller 205 for managing transmission sequence of the a-point to multi-point frames stored in the buffer 204 and of control frames stored in a control frames' buffer 214 to be described later, and an interface 206 for transmitting which sends a transmission frame picked up by the send sequence controller to the transmitter-receiver 20(0) through a signal line 23(0). The receiving system includes an interface 207 for receiving which receives a received frame such as a response frame from the transmitter-receiver 20(0) through a signal line 24(0), a frame identification unit 208 for determining the kind of the received frame, a buffer 209 for storing the response frame which has been determined by the frame identification unit 208, a timer 210, a response status estimation unit 211, a group address controller 212 for managing group addresses of response frame and retransmission request frame, a unit 213 of setting response request in frames which prepares response request frames, the aforementioned control frames' buffer 214 for storing control frames such as response request frames, and a buffer controller 215.

The operation of the a-point to multi-points communication controller 21(0) of master station 2(0) shown in FIG. 2 will now be described. Storage of a-point to multi-points messages in the buffer 201 through the interface 200 can be effected in an ordinary manner and will not be described herein. The information frame setting unit 202 divides the a-point to multi-points message stored in the buffer 201 into frames being each a bit string of a fixed length and stores the frames in the buffer 204. In this procedure, a divided bit string is inserted in an information field of an a-point to multi-points frame having a format to be described later. The header setting unit 203 inserts a header such as a send sequence number or an address into each a-point to multi-points frame stored in the buffer 204. Normally, the send sequence number is inserted in count-up fashion and the address is inserted as the global address. But if transmission is directed to only a specified receiving station group, the address is inserted as a group address.

In the presence of control frames stored in the control frames' buffer 214, the send sequence controller 205 sends the control frames to the transmitting interface 206 in first-in first-out fashion and in the absence of control frames stored in the control frames' buffer 214, it sends an a-point to multi-points frame stored in the buffer 204 to the transmitting interface 206. The frame sent to the transmitting interface 206 is transmitted to individual slave stations through the transmitter-receiver 20(0) and communication satellite 1 shown in FIG. 1. Upon completion of transmission of all transmission frames, the transmitting interface 206 sets the timer 210.

The operation of the receiving system of a-point to multi-points communication controller 21(0) will now be described. A received frame such as response frame from the transmitter-receiver 20(0) passes through the signal line 24(0) and interface 207 and the kind of the received frame is determined at the frame identification unit 208. If the received frame is decided to be a response frame at the frame identification unit 208, the response frame is stored in the buffer 209. If the received frame is decided to be a retransmission request frame, a send sequence number assigned to the retransmission request frame is sent to the response status estimation unit 211 through a signal line 217.

The response frame stored in the buffer 209 and the timer 210 are referenced to by the response status estimation unit 211 as will be described hereinafter. The response status estimation unit 211 produces a signal 219 when it is necessary for the master station 2(0) to retransmit an a-point to multi-points frame which has already been transmitted, a signal 221 when it is necessary for the master station to request a slave station to transmit a response frame, and a signal 222 when the retransmission is not necessary and the a-point to multi-points frame in the buffer 204 is permitted to be erased.

In response to the signal 219, the group address controller 212 informs the send sequence controller 205 of a send sequence number assigned to the a-point to multi-points frame now requested to be retransmitted. At that time, the send sequence controller 205 retrieves the a-point to multi-points frame requested for retransmission from the buffer 204 in the absence of control frames stored in the control frames' buffer 214, as described previously, so as to transmit that frame to the transmitting interface 206 in advance of transmission of a different a-point to multi-points frame which has not been transmitted yet. Thus, when responding to the signal 219 for retransmission request, the group address controller 212 permits retransmission to a slave station which is requesting retransmission. On the other hand, in response to both of retransmission request signal 219 and response frame request signal 221, the group address controller 212 detects and disconnects a group in which the frequency of retransmission request is high and a response state responsible for generation of the signal 221 adapted to request a response frame does not occur frequently.

A signal 220 representative of a result of disconnection, inclusive of a group address to be disconnected, is sent from the group address controller 212 to the response status estimation unit 211 to be detailed hereinafter. The buffer controller 215 is then informed of the fact that the a-point to multi-points frame which has already been transmitted and for which confirmation of response is unnecessary has been erased by group disconnection. In response to the signal 221 from the response status estimation unit 211, the response request frame setting unit 213 prepares a response request frame which requests that all of the slave stations or all slave stations in a specified group undertaking a-point to multi-points communication should transmit a response frame, and stores the response request frame in the buffer 214. The buffer controller 215 informed by the group address controller 212 and responding to the buffer release instruction 222 from the response status estimation unit 211 erases the a-point to multi-points frame in the buffer 204 and control frames in the buffer 214.

The construction and operation of the response status estimation unit 211 will now be described with reference to FIG. 3.

Figure 3:
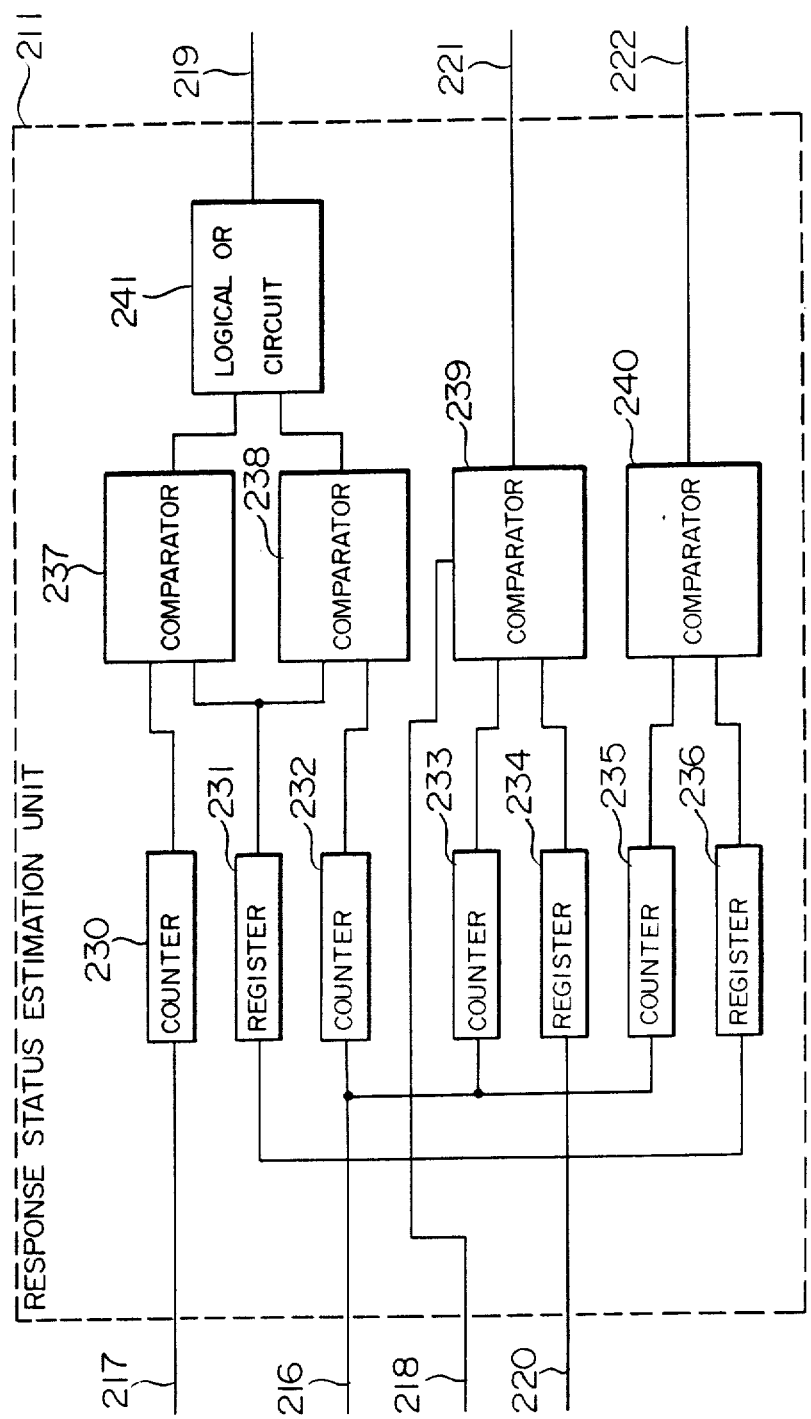
FIG. 3 is a block diagram schematically illustrating a response status estimation unit included in the a-point to multi-points communication controller of the master station.

Counters 230, 232, 233 and 235, registers 231, 234 and 236, comparators 237 to 240 and a logical OR circuit 241 are seen in FIG. 3, and they are provided for each group of receiving stations and each send sequence number assigned to a-point to multi-points frame. But for avoidance of prolixity, only one channel of these elements is illustrated in FIG. 3. When the frame identification unit 208 determines the retransmission request frame and produces the signal 217, this signal is counted by the counter 230 and a resulting count is sent to the comparator 237. The comparator 237 compares this input signal with a value of the register 231 applied to the other input and when the count of the counter 230 is larger, it delivers a signal 219 inclusive of a send sequence number to the group address controller 212 through the logical OR circuit 241.

The counters 232, 233 and 235 responsive to a signal 216 count the number of negated response frames, the total number of response frames and the number of acknowledged response frames within the buffer 209, respectively. Accordingly, the sum of counts of the counters 232 and 235 coincides with the count of the counter 233. The comparator 239 is triggered by a signal 218 which is delivered from the timer 210 at the termination of a predetermined interval of time following setting of the timer 210 by the transmitting interface 206. When the count of the counter 233 is smaller than the value of the register 234, the comparator 239 produces the signal 221 which requests each slave station to transmit a response. The comparator 240 sends the signal 222 for requesting buffer release to the buffer controller 215 when the count of the counter 235 is larger than the value of the register 236. In this manner, when the group address controller 212 determines disconnection of a receiving station group, the value is supplied through the signal line 220 to the registers 231, 234 and 236 of response status estimation unit 211 to change their values.

Figure 4:
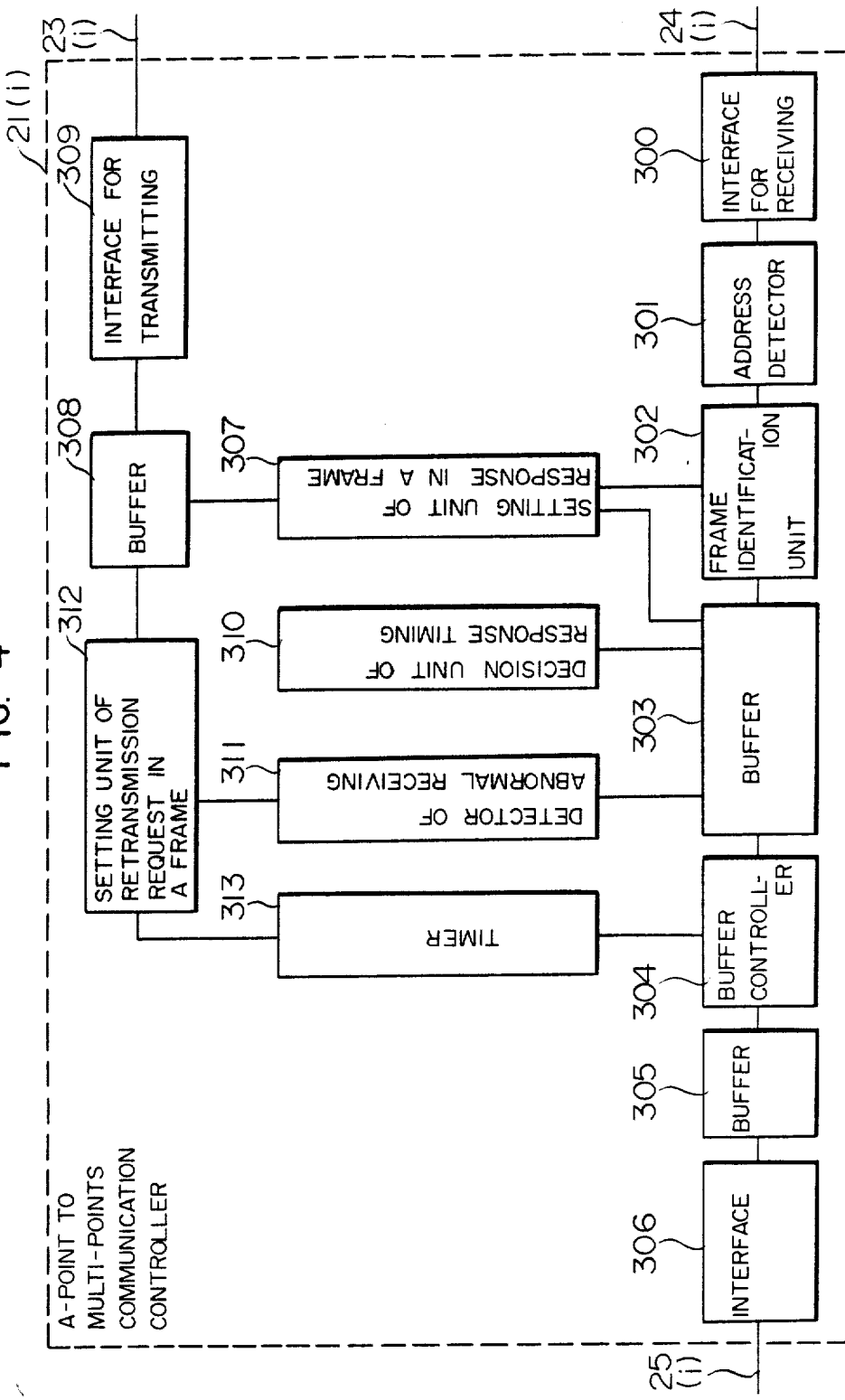
FIG. 4 is a block diagram schematically illustrating an a-point to multi-points communication controller included in a slave station in the satellite a-point to multi-points communication system.

Referring now to FIG. 4, the construction and operation of the a-point to multi-points communication controller 21(i) of each slave station 2(i) will be described. As shown, the a-point to multi-points communication controller 21(i) comprises an interface 300 for receiving, an address detector 301, a frame identification unit 302, buffers 303, 305 and 308, a buffer controller 304, an interface 306, a unit 307 of setting response in a frame, an interface 309 for transmitting, a decision unit 310 of response timing, a detector 311 of abnormal receiving, a unit 312 of setting retransmission request in a frame, and a timer 313.

With the construction shown in FIG. 4, the receiving interface 300 receives a signal 24(i) from the transmitter-receiver 20(i) and produces a signal which is supplied to the address detector 301. When a value in an address area of a received frame represents a global address or an address of a group to which a slave station in question belongs, the address detector 301 sends the received frame to the frame identification unit 302 but in the other case, it erases the received frame. If the received frame is a response request frame, the frame identification unit 302 sends the response request frame to the response frame setting unit 307 and if not, the frame identification unit 302 stores the received frame in the buffer 303.

The buffer controller 304 reads received frames (a-point to multi-points frames) stored in the buffer 303 in the order of send sequence numbers assigned to individual frames and stores the read-out frames in the buffer 305. Accordingly, if there is a frame which is in abnormal receiving, receiving frames assigned with send sequence numbers following a send sequence number assigned to the abnormally received frame can not be read. Operation in such a case will be described hereinafter.

The received frame being stored in the buffer 305 is read by means of the interface 306 and delivered as a signal 25($i$) to the equipment 22($i$) such as a computer or a terminal. The response frame setting unit 307 receiving the response request frame from the frame identification unit 302 prepares a response frame on the basis of a receiving status of each received frame in the buffer 303, inserts an address of own station in an address field of the response frame and stores the response frame in the buffer 308. The response timing decision unit 310 performs calculation pursuant to equation (1) on the basis of a send sequence number assigned to the latest received frame in the buffer 303 and if timing for the slave station in question to respond is decided, the unit 310 drives the response frame setting unit 307. Then the response frame setting unit 307 operates in the manner described previously.

The abnormal receiving detector 311 checks received frames preceding the latest received frame in the buffer 303 for their loss and in the presence of loss, it informs the retransmission request frame setting unit 312 of a retransmission request with a send sequence number assigned to a lost frame. In this case, a particular frame for which retransmission has once been requested is not permitted to request retransmission again. If lost frames occur in succession, retransmission requests with a send sequence number of the initial lost frame and a send sequence number of the last lost frame are informed. This means that if only one lost frame occurs, send sequence numbers of the initial and last frames merge into equality.

When receiving the retransmission request, the retransmission request frame setting unit 312 prepares a retransmission request frame having a format to be described hereinafter, inserts an address of own station in an address field of the retransmission request frame and stores the retransmission request frame in the buffer 308. At the same time, the retransmission request frame setting unit 312 sets the timer 313 by informing the timer of the send sequence number assigned to the lost frame. The transmitting interface 309 reads frames from the buffer 308 in first-in first-out fashion and sends read-out frames to the transmitter-receiver 20($i$) through the signal line 23($i$). Concurrently with reading of frames from the buffer 308, the frames are erased.

At the termination of a predetermined interval of time following setting, the timer 313 set by the retransmission request frame setting unit 312 drives the buffer controller 304 by informing it of the send sequence number. The buffer controller 304 driven by the timer 313 releases a received frame storage area corresponding to the send sequence number informed by the timer 313, thus making omissible the reception of an a-point to multi-points frame assigned with the send sequence number. In this case, time set in the timer 313 is more than twice as long as transmission time between master and slave stations, particularly, for satellite communication, it is more than twice as long as time required for the electric wave to make a return trip with respect to the satellite. Accordingly, if retransmission by the master station 2(0) confirms normal receiving, the frame of interest has already been delivered as signal 25($i$) to the equipment 22($i$) such as a computer or a terminal through the interface 306 and is not present in the buffer 303 when the buffer controller 304 is driven by the timer 313. In such an event, the buffer controller 304 does not carry out any processing.

Figure 5:
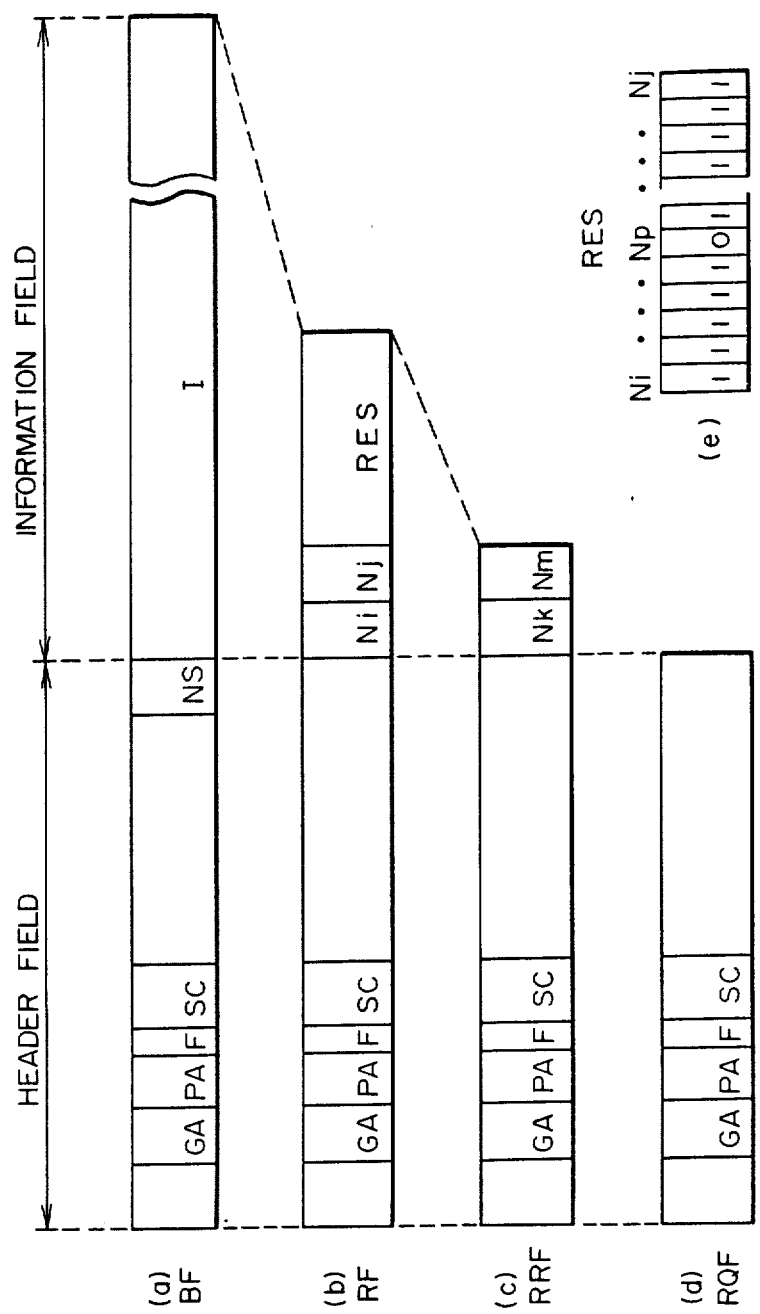
FIG. 5 is a diagram showing formats of frames used in the satellite a-point to multi-points communication system.

Referring to FIG. 5, the format of frames used in the present invention will be described. FIG. 5 illustrates at section (a) a format of an a-point to multi-points frame BF transmitted from the master station, at section (b) a format of a response frame RF transmitted from the slave station, at (c) a retransmission request frame RRF transmitted from the slave station, at (d) a format of a response request frame RQF transmitted from the master station, and at (e) a format of an area RES in the response frame RF shown at (b). In each frame shown in FIG. 5, areas not designated by reference character are independent of the essentially of the invention and will not be described herein. It is noted that a link set up frame used at the time of start of communication and a link disconnection frame used at the end of communication may have each the same format as shown at (d) in FIG. 5 with the only exception that an area F for indication of the kind of frame, to be described later, is changed correspondingly.

As will be seen in FIG. 5, each of the a-point to multi-points frame BF, response frame RF and retransmission request frame RRF is comprised of a header field and an information field. The header field of the a-point to multi-points frame BF includes an address area having a group address GA and an individuality address PA, a frame kind area F, a sub-control area SC and a send sequence number area NS. The information field of the a-point to multi-points frame BF, on the other hand, has an information area I of a fixed length in which messages to be transmitted to individual receiving stations are divided and stored. The header field of each of the response frame RF, retransmission request frame RRF and response request frame RQF has the same format as that of the a-point to multi-points frame BF with the only exception that the send sequence number area NS is removed. The sub-control area SC will be described hereinafter.

In using the frame kind area F, numerals 1, 2, 3 and 4, for example, are allotted to the a-point to multi-points frame BF, response frame RF, retransmission request frame RRF and response request frame RQF, respectively, and the kind or type of the individual frames are identified using the numerals. The information field of the response frame RF includes, for the purpose of collectively informing the master station of receiving states for a plurality of a-point to multi-points frames BF, a send sequence number area $N_i$ and a send sequence number area $N_j$ which respectively correspond to the initial and last areas in a receiving state area RES to be described later, and the receiving state area RES. The receiving state area RES will be described hereinafter by referring to section (e) in FIG. 5.

The information field of the retransmission request frame RRF includes, for the purpose of permitting a slave station of interest to request retransmission of a-point to multi-points frames BF assigned with successive send sequence numbers, an area $N_k$ indicative of the initial send sequence number and an area $N_m$ indicative of the last send sequence number. The response request frame RQF has no information field. The manner of using the individual types of frame has already been described in connection with the operation of the a-point to multi-points communication controllers 21(0) and 21($i$) of master station and slave station and will not further be described herein.

The receiving state area RES of the response frame RF will now be described by making reference to section (e) in FIG. 5. The receiving state area RES has a length of $(N_j - N_{i+1})$ bits. Respective bits correspond to respective send sequence numbers assigned to a-point to multi-points frames BF in order to indicate receiving states for the a-point to multi-points frames. Particularly, in the illustration at (e) in FIG. 5, normal receiving state is represented by "1" and abnormal receiving state by "0". Accordingly, an a-point to multi-points frame BF assigned with a send sequence number $N_p$ is illustrated as being received abnormally by the slave station in question.

The number of frames counted by individual counters in the response status estimation unit 211 of a-point to multi-points communication controller 21(0) of the master station, for example, the number of negated response frames represents the number of "0's" indicative of abnormal receiving states in connection with some of the send sequence numbers in the receiving state area RES for a plurality of response frames RF transmitted from the individual slave stations.

Figure 6:
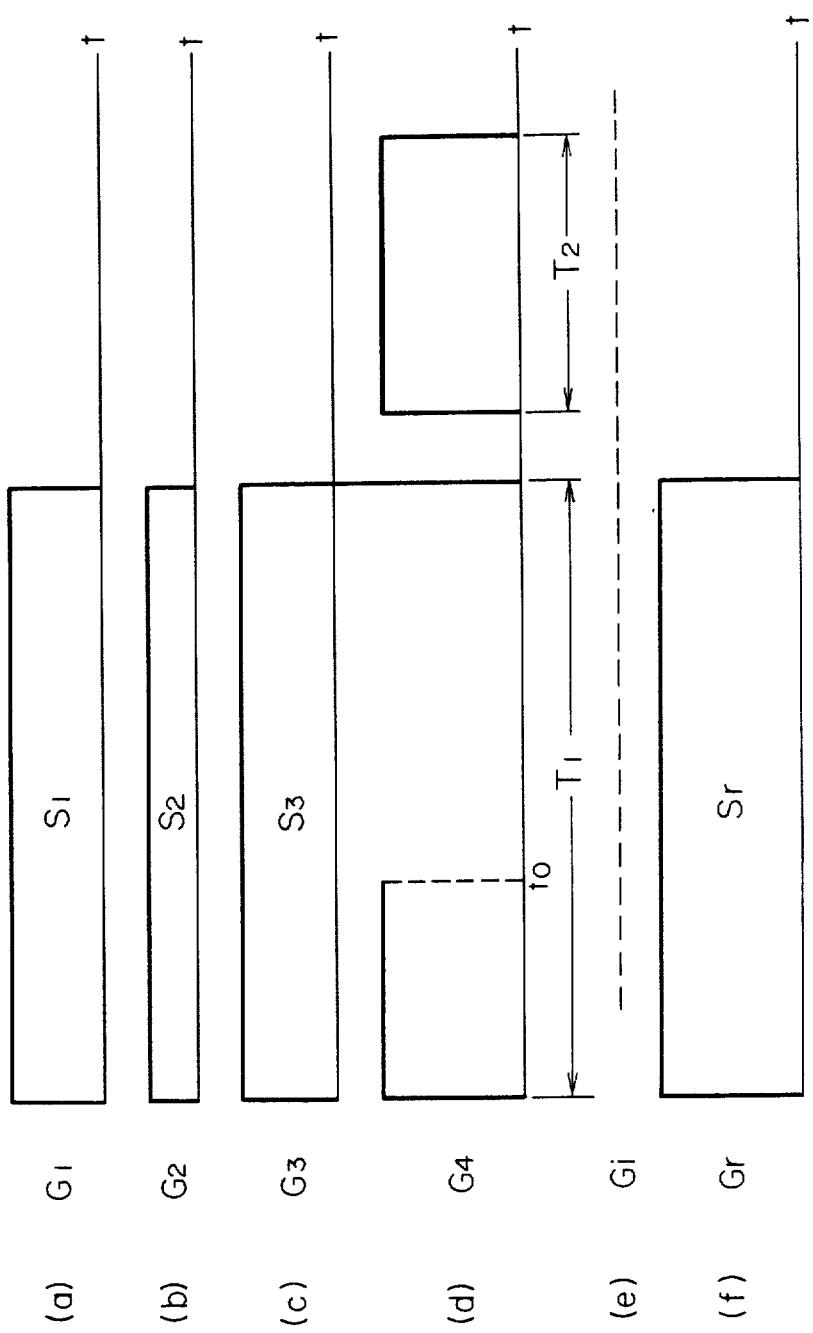
FIG. 6 is a diagram for explaining communication throughputs obtained when disconnection of a receiving station group and retransmission are effected in accordance with an embodiment of the invention.

Referring to FIG. 6, retransmission using a group address will now be described.

FIG. 6 illustrates communication processing states of groups $G_1$, $G_2$, -, $G_r$ of slave stations 20(i) in relation to the master station 20(0), where abscissa represents time t and ordinate represents the number of slave stations contained in individual groups. Thus, if time required for the master station 20(0) to transmit a message is $T_1$, the throughput of communication by the master station 20(0) corresponds to the sum S of rectangular areas extending over time $T_1$, that is, $$S = S_1 + S_2 + - + S_r.$$

This sum S of rectangular areas contains overhead necessary for communication processings to be carried out simultaneously in relation to a great number of slave stations or a great number of groups. Assume now that link condition is bad for a group $G_4$ and the master station 20(0) disconnects individual receiving stations contained in the group $G_4$ at time $t_o$. This disconnection may be effected in the manner as described previously in connection with the operation of the response status estimation unit 211 and group address controller 212.

In this procedure, the group address controller 212 temporarily stores the disconnected group $G_4$ and transmits again a message in question to the group $G_4$ after transmission of a series of messages to groups other than group $G_4$ has been completed. In this case, the group address GA shown in FIG. 5 is used so that individual slave stations of the other groups than group $G_4$ will not perform receiving operation, the master station 20(0) will minimize throughput for response frame RF, and transmission of the series of messages will be completed within time $T_2$. Because of the reduced overhead in the master station 20(0), the interval of time $T_2$ is shorter than the interval of time $T_1$.

Since, in accordance with the present embodiment, the master station 20(0) can confirm arrival of an a-point to multi-points frame BF at individual slave stations 20(i) by generally receiving a response frame RF from the individual slave stations 20(i), reliability of the a-point to multi-points message received by the individual slave stations 20(i) can be insured. Specifically, the master station 20(0) does not receive the response frame RF from all of the slave stations 20(i) each time it transmits the a-point to multi-points frame BF but receives from a small number of slave stations. Consequently, the overhead for reception processing of the response frame RF in the master station 20(0) can be mitigated and the throughput can be improved as a whole.

Since the master station 20(0) sequentially transmits a-point to multi-points frames BF stored in the buffer without waiting for a response from individual slave stations 20(i), the transmission interval between frames can be reduced to thereby reduce time required for transmitting a series of a-point to multi-points messages. Especially, in the satellite communication system in which the propagation delay time between master station and slave station is large, the reduction effect is eminent and the throughput can be improved greatly. The individual slave stations 20(i) can transmit a retransmission request frame as soon as detecting abnormal receiving and a plurality of abnormally received a-point to multi-points frames BF can be responded collectively by one retransmission request, thereby making it possible to rapidly cure the abnormally received a-point to multi-points frame and reduce the number of retransmission request frames RRF. Further, a receiving station group in which the frequency of abnormal receiving of an a-point to multi-points frame BF is high is disconnected and after completion of transmission of a message which consists of a series of a-point to multi-points frames, the a-point to multi-points frame is retransmitted to the disconnected receiving station group, thereby ensuring that loading on the master station 20(0) can be decreased and time for transmission of a series of a-point to multi-points frames can be reduced.

Consider an instance where the number of slave stations is very large in the a-point to multi-points communication system shown in FIG. 1. In this case, the system operates as will be described below.

For the number of slave stations being small, it suffices that a response frame is transmitted when equation (1) stands with $Y_i$ being unique to individual slave stations, as described previously.

But for the number of slave stations being very large, the method based on equation (1) is disadvantageous in that each slave station is only permitted to transmit the preceding response frame and the succeeding response frame at a long period and the master station is only permitted to confirm receiving states of individual slave stations at a long interval of time. To cope with these problems, the slave stations are divided into groups and the same timing value $Y_i$ is assigned in common to all slave stations in respective groups, as described previously. (First method)

Figure 7:
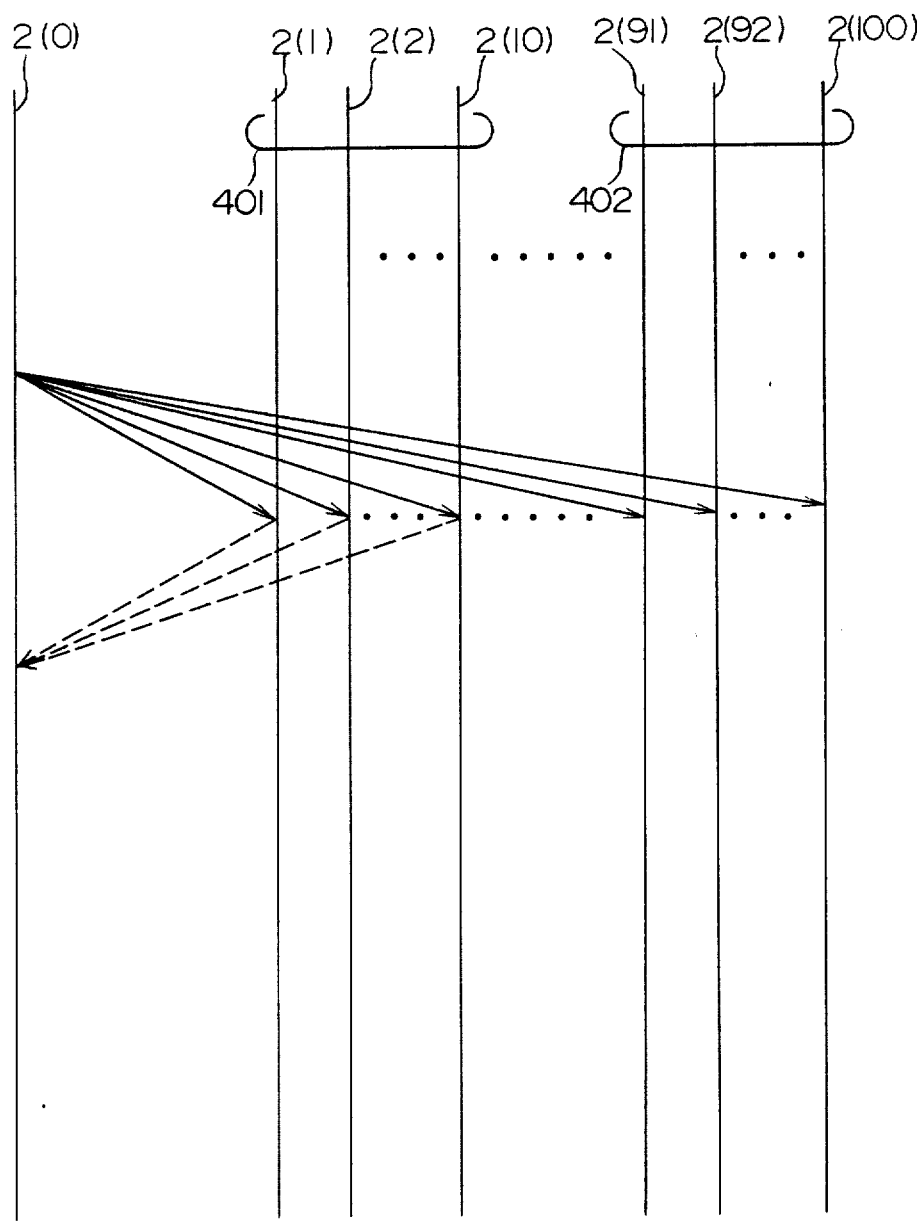
FIGS. 7 and 8 are diagrams for explaining transmission sequence applicable to the case where a great number of slave stations are provided.

Assume that the number of slave stations associated with the master station 2(0) is 100 and the 100 slave stations are divided into 10 groups 401 to 402 containing each 10 slave stations, as shown in FIG. 7 wherein solid line represents an a-point to multi-points frame and dashed line represents a response frame.

The values $Y_i$, generally otherwise assigned uniquely to individual slave stations, are specifically assigned to individual groups herein as below and the first method is applied to each group:

| Group I: | earth stations 2(1) | to 2(10) | — | $Y_1 = 0$ |
|---|---|---|---|---|
| Group II: | earth stations 2(11) | to 2(20) | — | $Y_2 = 1$ |
| Group III: | earth stations 2(21) | to 2(30) | — | $Y_3 = 2$ |

-continued

Group X:   earth stations 2(91)   to 2(100)   —   $Y_{10} = 9$.

In this instance, 10 *slave stations in all in each group respond to an a-point to multi-points frame of the same send sequence number $N_s$ and transmit response frames simultaneously.*

In an alternative, the values $Y_i$ are collectively assigned to individual slave stations as follows. (Second method)

More particularly, the same $Y_i$ is assigned substantially uniformly throughout individual groups as exemplified below.

| Group | $Y_i$ | | | | |
|---|---|---|---|---|---|
| | 0 | 1 | 2 | ... | 9 |
| Group I | 2(1) | 2(2) | 2(3) | | 2(10) |
| Group II | 2(11) | 2(12) | 2(13) | | 2(20) |
| Group III | 2(21) | 2(22) | 2(23) | | 2(30) |
| Group X | 2(91) | 2(92) | 2(93) | | 2(100) |

In the above, table 2(i) represents slave stations. Although, in this table, values of $Y_i$ assigned to respective slave stations in each group are different from each other, the same value may be assigned to some of slave stations in each group. For example, by using five kinds of values 0 to 4 as $Y_i$ in connection with the above example, some of slave stations in the same group can be assigned with the same value of $Y_i$.

By assigning the value of $Y_i$ to individual slave stations throughout groups of slave stations in this manner, quality of master/slave station link can advantageously be supervised as will be described below.

For example, slave stations may be divided into groups in accordance with regions. In other words, slave stations located in a certain region may be ganged into the same group.

In the a-point to multi-points communication system based on satellite communication, the quality of link is affected by weather. Weather conditions often differ from region to region and the quality of link in satellite communication tends to differ from region to region.

Accordingly, given the values $Y_i$ being collectively assigned to individual slave stations in accordance with the aforementioned first method, in the event that degradation in the quality of link takes place in the same region or in the same group, respective slave stations in that group are concurrently prevented from making a response. In this situation, the master station fails to receive response frames at a certain timing which is identical for the slave stations in question.

In contrast, given the values $Y_i$ being collectively assigned to individual slave stations in accordance with the above second method, even in the event of the degraded quality of link, the number of slave stations prevented from responding at each response timing can be reduced to only one in the case of the above table.

Thus, the second method is preferable in managing response status to supervise the quality of link dependent on regions.

Figure 8:
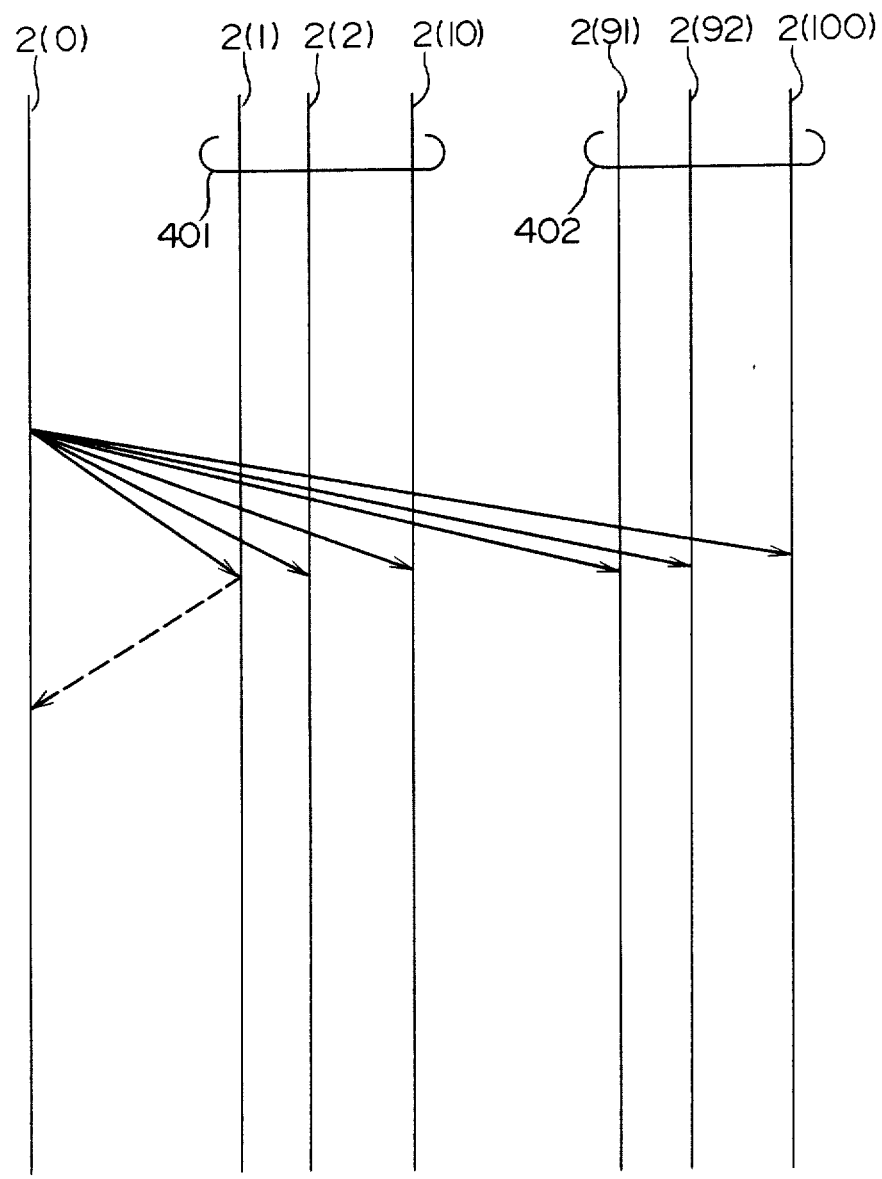

In an alternative for the number of slave stations being very large, the system may be modified as below. More particularly, in this modification, slave stations are divided into groups in the same manner as above and in addition, there is provided in each group a specified station which collectively performs transmission of response frame. For example, when a slave station 2(1) is designated as a specified station in group 401, the system operates as shown in FIG. 8. In FIG. 8, solid line represents an a-point to multi-points frame and dashed line a response frame. Designation of specified station within each group may be changed as desired.

Figure 9:
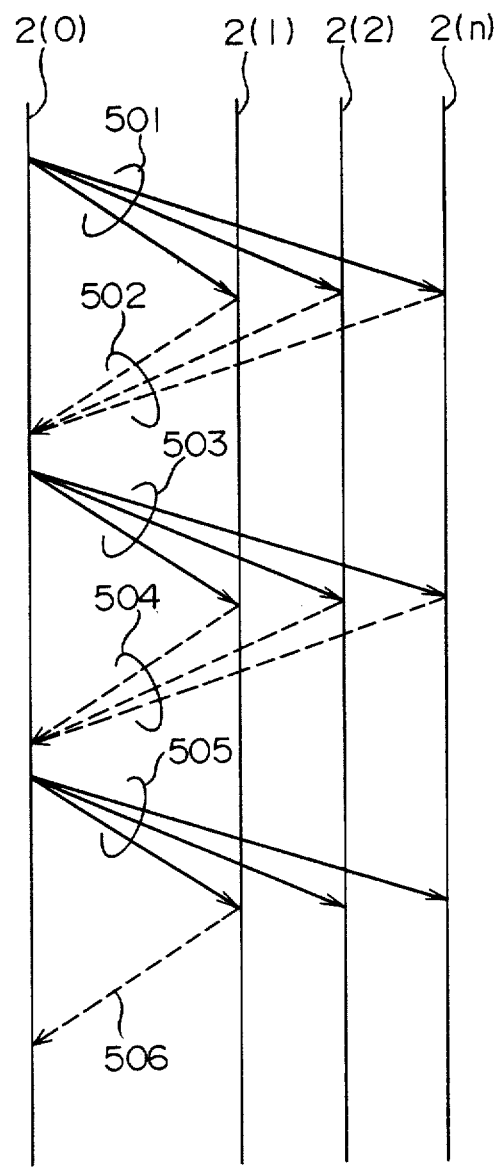
FIG. 9 is a diagram for explaining transmission sequence at the time of start of communication.

Referring to FIG. 9, it will be described how the response transmission timing and the total number of stations or the total number of groups can be recognized by the slave station. The master station for transmitting an a-point to multi-points frame transmits, prior to transmission of the a-point to multi-points frame, a control frame 501 (link set up frame described previously) to each slave station in order to confirm operation state of each slave station and receives from individual slave stations response frames 502 responsive to the control frame so as to determine the number of normal response frames to be equal to the total number of slave stations. Subsequently, the master station determines the values X and $Y_i$ on the basis of the total number of slave stations and transmits the determined values X and $Y_i$ to all of the stations by way of transmission as designated by 503. Then, each slave station uses the received values X and $Y_i$ to perform such control as described previously.

In the foregoing, the earth station for transmitting a-point to multi-points information, that is, the master station has been described as being predetermined but the master station may be exchanged in a manner described as below. Particularly, a system will be described wherein a processing for acquisition and transfer of the permission to transmit (the permission to behave as the master station and to transmit the a-point to multi-points information) is performed between master and slave stations in parallel with the above-described a-point to multi-points information communication processing effected between master and slave stations, so that the present master station may determine a new or next master station and inform each slave station of the newly determined master station at the time of termination of a-point to multi-points communication.

In the past, there are provided a station for managing the permission to transmit (permission to transmit managing station) and a station for requesting the permission to transmit (permission to transmit requesting station), the permission to transmit requesting station transmits, at a predetermined time, to the permission to transmit managing station an independent frame for requesting the permission to transmit, and the permission to transmit managing station receiving the independent frame determines a station to which the permission to transmit is given. Also, JP-A-60-251727 discloses a scheme wherein the permission to transmit managing station carries out polling for individual stations to determine a station to which the permission to transmit is given in accordance with a response from the permission to transmit requesting station. However, the provision of the exclusively-used permission to transmit managing station, which serves as neither master station nor slave station, raises cost of the system and disadvantageously can only permit acquisition and transfer of the permission to transmit at the cost of degraded efficiency of line utilization.

To eliminate these disadvantages, in the system to be described below, any special transmission frame used for acquisition and transfer of the permission to transmit is not provided but an area for acquisition of the permission to transmit (sub-control area SC described previously) is provided in a frame used for a series of a-point to multi-points information communication between master and slave stations, and the area for acquisition of the permission to transmit is used between master and slave stations to cause the present master station to determine a new master station before a series of a-point to multi-points information communication ends.

More specifically, the area SC for acquisition of the permission to transmit is provided in a frame used for a series of a-point to multi-points information communication between master and slave stations or in a control frame used for logically disconnecting the link, and each slave station, when requesting the permission to transmit, sets a bit string representative of a request for the permission to transmit in the area SC of a response frame, thereby completing the request for the permission to transmit. In response to the request for the permission to transmit, the present master station determines a new master station on the basis of a predetermined rule before a link disconnection request frame (a frame informing that the link is disconnected logically at the end of a series of a-point to multi-points communication) is transmitted and informs each slave station of the new master station by setting an address of the new master station in the area SC of the link disconnection request frame.

Figure 10:
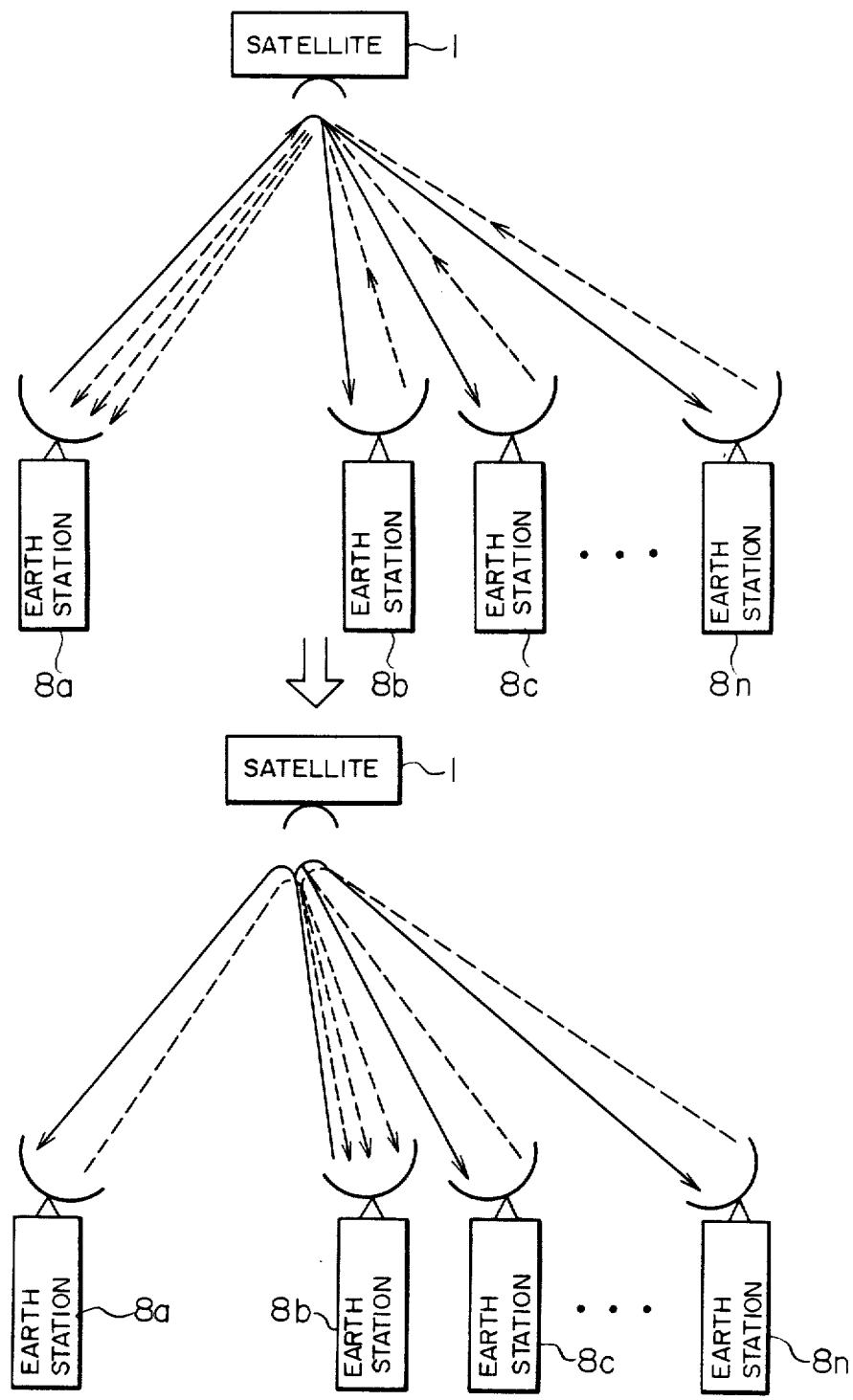
FIG. 10 is a diagram useful in explaining transfer operation of the permission to transmit in the satellite a-point to multi-points communication system.
Figure 11:
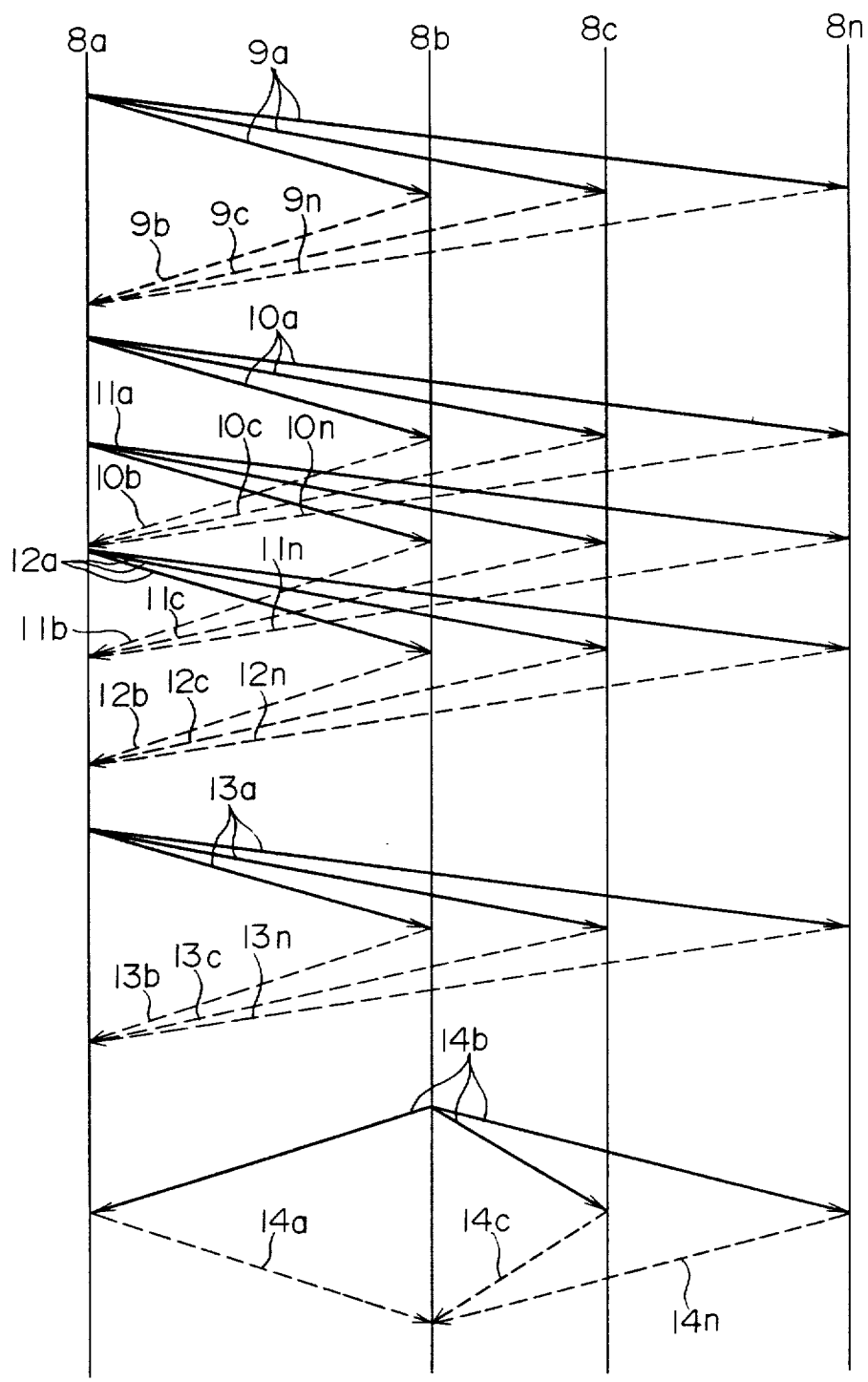
FIG. 11 is a diagram for explaining processing sequence in the transfer operation of the permission to transmit.

Exemplarily, FIG. 10 is illustrative of the operation of a satellite a-point to multi-points communication system constituted by a satellite 1 and earth stations 8a, 8b,-8n, indicating that when transmission of a series of a-point to multi-points information from the present master station 8a ends, the permission to transmit is transferred to the station 8b. FIG. 11 shows sequence of processing in this operation. In FIG. 11, 9a designates a link set up request frame (a frame for requesting logical link connection in advance of a series of a-point to multi-points communication) for the station 8a, and 9b, 9c,-9n designate link set up response frames (responsive to the frame 9a) from the stations 8b, 8c,-8n, respectively. Denoted by 10a, 11a and 12a are a-point to multi-points frames from the master station 8a, by 10b, 11b and 12b are response frames from the station 8b, by 10c, 11c and 12c are response frames from the station 8c, and by 10n, 11n and 12n are response frames from the station 8n. Denoted by 13a is a link disconnection request frame from the station 8a, by 14b is a link set up request frame from the station 8b, and by 14a, 14c,-14n are link set up response frames from the stations 8a, 8c,-8n.

Figure 12:
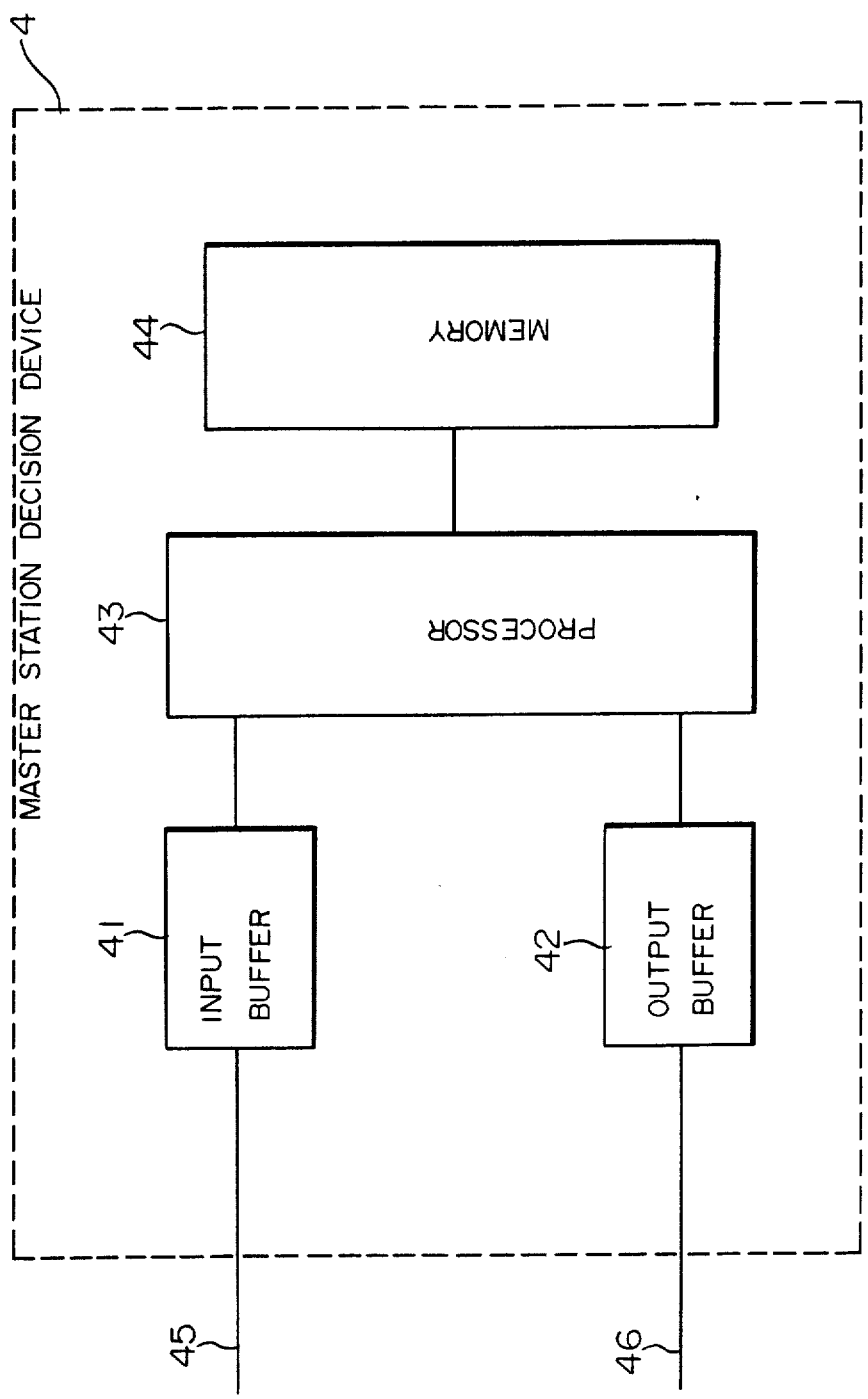
FIG. 12 is a schematic block diagram of a master station decision device.
Figure 13:
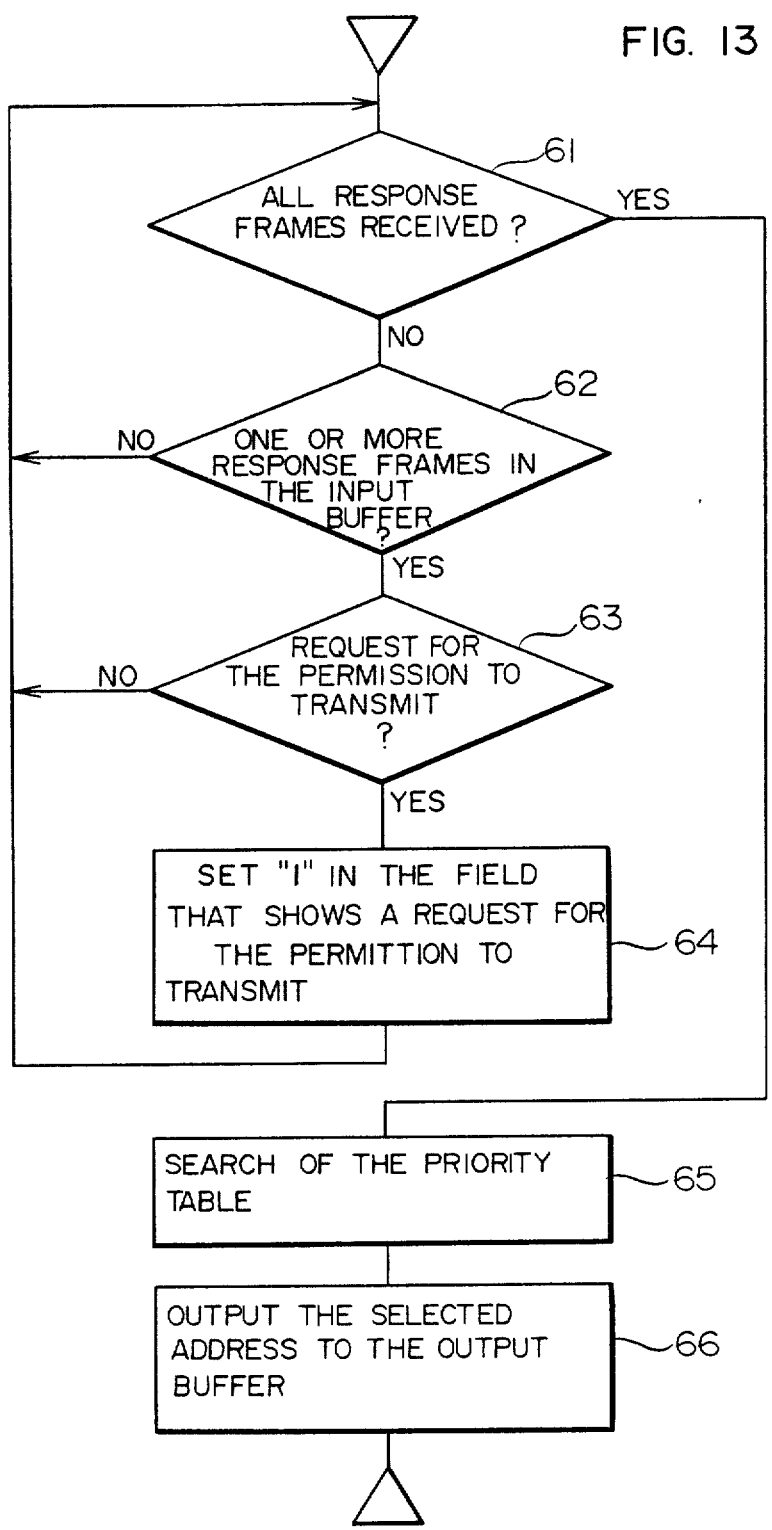
FIG. 13 is a flow chart showing processing procedure in the master station decision device.
Figure 14:
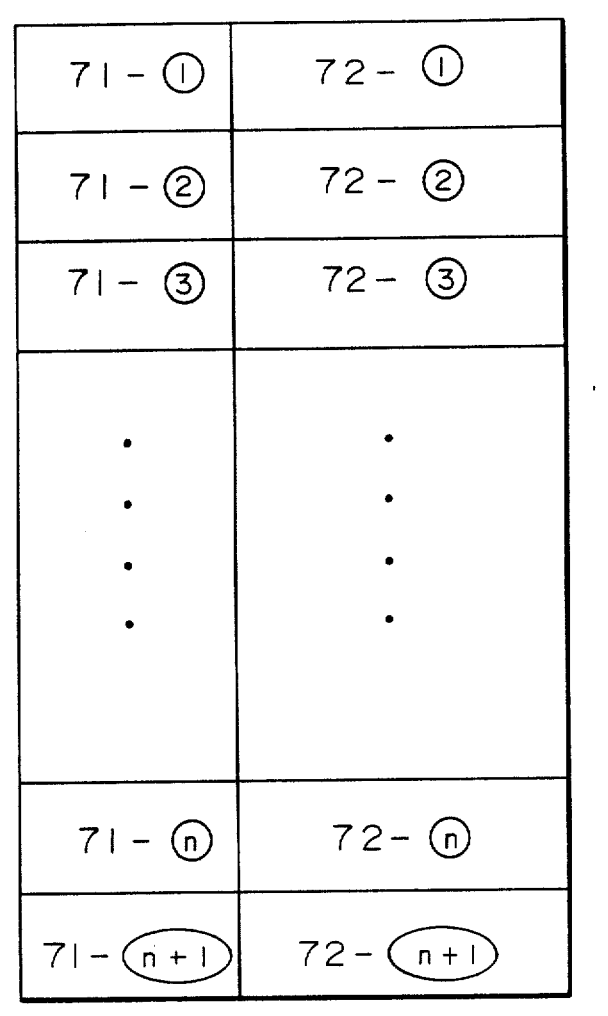

FIG. 12 shows the construction of a master station decision device 4. The master station decision device 4 comprises an input buffer 41, an output buffer 42, a processor 43 and a memory 44, and it is connected to the a-point to multi-points communication controller 21(i), where i=0, 1, 2,-n, by lines 45 and 46. For simplicity of illustration, the master station decision device 4 is not depicted in FIG. 1. The processor 43 carries out processings in accordance with a flow chart as shown in FIG. 13. The memory 44 has a priority table formatted as shown in FIG. 14. The priority table is divided into (n+1), equalling (the total number of slave stations)+1, permission to transmit request areas 71 and address areas 72 indicative of addresses of individual stations. The address areas 72 store, starting from the head area, addresses of the individual stations in the order of descent of priority. More particularly, an address of a station having the highest priority is stored in the first area and an address of a station having the lowest priority is stored in the n-th area. Stored in the (n+1)-th permission to transmit request region 71 is numeral "1" and stored in the (n+1)-th address area 72 is an address of own station.

For convenience of explanation, the operation will now be sorted into a usual sequence mode and an exceptional sequence mode.

(a) Usual sequence mode

The manner of transferring the permission to transmit to the station 8b after completion of transmission by the present master station 8a, as shown in FIG. 10, will be described with reference to FIG. 11. In order for the slave station 8b to acquire the next permission to transmit, the slave station 8b inserts in the area SC of a response frame 10b responsive to an a-point to multi-points frame 10a a code indicative of a request for the permission to transmit (obtained by, for example, making all bits in area SC "1" and referred hereinafter to as "permission to transmit request code") and transmits the response frame 10b. Under this condition, it is assumed that the slave station 8n subsequently requests the permission to transmit by using a response frame 12n in a similar manner.

Under the circumstances, the master station 8a being in receipt of the response frames 10b and 12n knows, from the bit string in area SC of respective response frames, that the two stations 8b and 8n are requesting the permission to transmit, and the master station decision device 4 in the master station 8a makes a decision in accordance with a predetermined rule (governed by, for example, priority, rotation or earlier arrival and particularly defined herein as a priority rule) so as to determine a new master station. The master station decision device 4 operates for determination of the new master station as will be detailed subsequently. Given the priority purporting 8b>8n, the station 8b is scheduled to be the new master station. Then, when transmitting a link disconnection request frame 13a after completion of transmission of a series of a-point to multi-points information, the present master station 8a inserts an address of the station 8b in the sub-control area SC of the frame 13a and then transmits the link disconnection request frame 13a.

When receiving the link disconnection request frame 13a, all of the slave stations 8b to 8n recognize from the sub-control area SC indicative of the address of station 8b that exchange of the master station is to be done and the station 8b is scheduled to be the new master station. From the sub-control area SC of the link disconnection request frame, the station 8n also recognizes a failure to acquire the permission to transmit. Each slave station then transmits a response frame responsive to the link disconnection request frame from the present master station 8a. The master station 8a detects the response frames and recognizes, by particularly detecting a response frame from the station 8b scheduled to be the next master station, that transfer of the permission to transmit is scheduled. Unless detecting the response frame from the expectant master station 8b, the present master station 8a retransmits the link disconnection request frame until it receives the response frame from the station 8b. Through the above operation, the next master station can be decided before the transmission processing of the a-point to multi-points information from the master station 8a ends and the station 8b acquires the permission to transmit.

In case where the sub-control area SC need not signify to the above effect, a bit string which represents neither addresses of the master and slave stations nor the permission to transmit request code is inserted.

(b) Exceptional sequence mode

The exceptional sequence mode is a supplemental processing sequence mode which is carried out during start-up of the system and when a request for the permission to transmit is not transmitted from any slave station at the time of completion of a series of a-point to multi-points information transmission sequence by the master station.

As described above, any slave station, if desiring to acquire the permission to transmit, must request the permission to transmit before it transmits the last response frame in a series of a-point to multi-points information transmission sequence. This can eliminate the need of new sequence for decision of master station.

However, during start-up of the system and when a request for the permission to transmit is not transmitted from any slave station at the time of completion of a series of a-point to multi-points information transmission sequence by the master station, a processing sequence must be supplemented.

(a) Operation during start-up of system

During start-up of the system, the initial master station (hereinafter referred to as a "transmission start station") is set in accordance with a predetermined rule, for example, the priority rule described previously.

If a-point to multi-points information to be transmitted is present, the transmission start station carries out the same processing as the aforementioned usual sequence mode. If any a-point to multi-points information to be transmitted is absent, the transmission start station makes zero the bit length of the information field of an a-point to multi-points frame after completion of link set up, and repeats transmission of the a-point to multi-points frame until it detects a request for the permission to transmit from another station. In requesting the permission to transmit, each slave station uses, as in the case of the usual sequence, the area SC of a response frame responsive to the a-point to multi-points frame. When detecting the permission to transmit request, the transmission start station decides the next master station in accordance with the permission to transmit request at that time and the predetermined rule, as in the usual sequence, and informs each slave station of the decision, thereby completing the transmission sequence by own station.

In brief, the operation during start-up of the system is of the same processing as the usual sequence mode with the exception that the bit length of the information field of the a-point to multi-points frame is made to be zero and that transmission of the a-point to multi-points frame is repeated until the request for the permission to transmit from another station is detected.

(b) Operation carried out when a request for the permission to transmit is not transmitted at the time of completion of a-point to multi-points information transmission sequence by the present master station.

In the absence of a request for the permission to transmit at the time of completion of the a-point to multi-points information transmission sequence, that is, in case where none of the response frames 10b to 12b, 10c to 12c, -10n to 12n contains the code representative of the permission to transmit request, the present master station 8a inserts an address of own station in the sub-control area SC of a link disconnection request frame 13a and transmits the frame 13a, thereby informing each station that the station 8a continues to behave as the master station. Each slave station being in receipt of the link disconnection requist frame 13a recognizes that the present master station 8a is scheduled to behave as the next master station and transmits a link disconnection response frame. After receiving all link disconnection response frames, the present master station 8a continues to carry out the same processing as the "Operation during start-up of system" done by the transmission start station.

Referring now to FIGS. 12 to 14, the operation of the master station decision device 4 will be described.

When receiving a response frame from a slave station, the a-point to multi-points communication controller of the master station delivers a header field of the response frame to the input buffer 41 of the master station decision device 4. The processor 43 of the master station decision device 4 decides the presence or absence of response frame in the input buffer 41, as shown at step 62 in FIG. 13. In the presence of a response frame, the processor decides in step 63 whether the permission to transmit request code is inserted in the area SC in the header field of the response frame. If the permission to transmit request code is inserted, "1" is inserted in a permission to transmit request area 71 corresponding to an address area 72 (see FIG. 14) having an address coincident with an address contained in the response frame, in step 64.

The above operation is effected for all response frames responsive to a series of a-point to multi-points frames.

When completion of reception of all the response frames is recognized (step 61), the priority table in the memory 44 is sequentially retrieved, starting from the head (step 65) and an address of an address area 72 corresponding to a permission to transmit request area 71 which is the earliest in assuming "1" is delivered to the output buffer 42 (step 66). Accordingly, if none of the slave stations requests the permission to transmit, the (n+1)-th address or the address of own station is selected. The a-point to multi-points communication controller 21(0) picks up the address from the output buffer 42 and inserts it into the sub-control area SC of a link disconnection request frame.

Upon receipt of a link set up request frame, each station resets contents of the permission to transmit request area 71 in the priority table.

Since in the foregoing embodiment the sub-control area (SC) in the header field and the processing for acquisition and transfer of the permission to transmit is carried out between master and slave stations in parallel with the a-point to multi-points communication processing, the next master station can be decided without changing the processing sequence or providing an additional processing sequence mode for the sake of acquiring the permission to transmit, thereby making it possible to reduce time for acquisition and transfer of the permission to transmit as compared to the case where acquisition and transfer of the permission to transmit is effected through an independent processing.

As described above, according to the invention, the following beneficial effects can be attained.

(1) In the master station, there is provided means for detecting that the number of slave stations, among a plurality of slave stations transmitting response frames, which transmit a response frame including information indicative of abnormal receiving or normal receiving by those slave stations of an a-point to multi-points frame of the same send sequence number from the master station is above a predetermined value (in the case of abnormal receiving) or below a predetermined value (in the case of normal receiving), whereby the master station can confirm arrival of the a-point to multi-points frame at individual slave stations by simply processing response frames from a small number of slave stations to thereby insure reliability of a-point to multi-points information, mitigate the overhead for response processing in the master station and improve the throughput of the system as a whole.

(2) In the master station, there is provided means for detecting that the number of slave stations which transmit a frame for requesting retransmission of an a-point to multi-points frame of the same send sequence number from the master station is above a predetermined value, whereby the master station can immediately retransmit the a-point to multi-points frame without waiting for response frames from all slave stations to thereby insure reliability of a-point to multi-points information and improve the throughput.

(3) Since individual slave stations respond to transmission of individual a-point to multi-points frames from the master station in accordance with a rule which predetermines response timing, it suffices that only a small number of slave stations respond, so that the overhead for receiving processing of response frame in the master station can be mitigated and the throughput of the a-point to multi-points communication system can be improved.

(4) When slave stations are divided into groups and means for causing the master station to detect arrival of an a-point to multi-points frame at a unit of group is provided, retransmission in unit of group and disconnection from the object being handled for control can be ensured to thereby mitigate loading on the master station, reduce time for transmission and improve throughput.

(5) By providing means for causing the present master station to determine the next master station during transmission of a series of a-point to multi-points frames, acquisition and transfer of the permission to transmit can be carried out without requiring additional time therefor and the throughput can be improved.

We claim:

1. An a-point to multi-points communication system comprising:
   a master station for transmitting an a-point to multi-points
   a plurality of slave stations for receiving said a-point to multi-points frame, and for returning response frames each including an indicator for indicating, to said master station, whether said a-point to multi-points frame said master station is received normally or abnormally by a slave station in response to said received a-point to multi-points frame;
   said master station including:
   counting means for counting the number of slave stations which return a response frame including an indicator indicating abnormal receiving of said a-point to multi-points frame, and
   detecting means for detecting whether the number of slave stations counted by said counting means is above a predetermined value indicating that said a-point to multi-point frame is to be retransmitted.

2. An a-point to multi-points communication system according to claim 1, wherein said master station further comprises retransmission means for retransmitting said a-point to multi-points frame if said detecting means detects that the number of slave stations counted by said counting means is above said predetermined value.

3. An a-point to multi-points communication system comprising:
   a master station for transmitting an a-point to multi-points frame; and
   a plurality of slave stations for receiving said a-point to multi-points frame, and for returning response frame each including an indicator for indicating to said master station, whether said a-point to multi-points frame from said master station is received normally or abnormally by a slave station in response to said a-point to multi-points frame;
   said master station including
   counting means for counting the number of slave stations which returns a response frame including an indicator indicating normal receiving of said a-point to multi-points frame, and
   a detecting means for detecting whether the number of slave stations counted by said counting means is below a predetermined value indicating that said a-point to multi-points frame is to be retransmitted after a time delay, in response to said a-point to multi-points frame.

4. An a-point to multi-points communication system according to claim 3, wherein said master station further comprises:
   retransmission means for retransmission said a-point to multi-points frame if said detecting means detects that the number of slave stations counted by said counting means is below said predetermined value.

5. An a-point to multi-points communication system comprising:
   a master station for transmitting an a-point to multi-points frame; and
   a plurality of slave stations for receiving said a-point to multi-points frame, and for returning response frames each including an indicator for requesting, from said master station, retransmission of said a-point to multi-point frame in case where said a-point to multi-points frame is not received by a slave station, in response to said a-point to multi-points frame;
   said master station including
   counting means for counting the number of slave stations which return response frame including an indicator requesting retransmission of said a-point to multi-points frame, and
   a detection means for detecting whether the number of slave stations counted by said counting means is above a predetermined value indicating a request for retransmitting said a-point to multi-point frame.

6. An a-point to multi-points communication system according to claim 5, wherein said master station further comprises:
   retransmission means for retransmitting said a-point to multi-points frame if said detecting means detects that number of slave stations counted by said counting means is above said predetermined value.

7. An a-point to multi-points communication system comprising:
   a master station for transmitting an a-point to multi-point frame; and a plurality of slave stations for receiving said a-point to multi-points frame and for returning response frames each including an indicator for indicating, to said master station, whether said a-point to multi-points frame from said master station is received normally or abnormally by said slave station in response to said received a-point to multi-points frame;

said master station including:

counting means for counting the number of slave stations which return frame including an indicator indicating abnormal receiving or normal receiving of said a-point to multi-points frame, and a detecting means for detecting whether the number of slave stations counted by said counting means is above a predetermined value indicating that said a-point to multi-points frame is to be retransmitted after a time delay, in response to said a-point to multi-points frame.

8. An a-point to multi-points communication system according to claim 7, wherein said master station further comprises:

retransmission means for retransmitting said a-point to multi-points frame if said detecting means detects that the number of slave stations counted by said counting means is below said predetermined value.

9. An a-point to multi-points communication system according to claim 7, wherein said master station further comprises:

a transmission means for transmitting a requesting frame of said response frame;

first detecting means detecting the number of slave stations which return said response frame including information indicative of normal and abnormal receiving of said a-point to multi-points frame; and second detecting means for detecting whether the number detected by said first detecting means is more than a predetermined value which is a value between zero and the number of all of said slave stations, after a time delay of said response frame which is responsive to said requesting frame.

10. An a-point to multi-points communication system according to claim 9, wherein said master station further comprises:

retransmission means for retransmitting said a-point to multi-points frame when said second detecting means detects that the number detected by said first detecting means is less than said predetermined value.

11. An a-point to multi-points communication system having a master station for transmitting an a-point to multi-points frame and a plurality of slave stations for receiving said a-point to multi-points frame, each of said slave station comprising:

executing means for executing a division of a sequence number assigned to said a-point to multi-points frame by a first value (X) which is predetermined at random being in common to all of said slave stations; and transmitting means for transmitting a response frame in response to said a-point to multi-points frame if a residue of said division coincides with a second value Yi, where $0 \leq Y_i \leq S \leq 1[Y_i < X]$, which is preassigned to said each slave station.

12. An a-point to multi-points communication system according to claim 11, wherein said each slave station further comprises:

inserting means for inserting, in said response frame, information indicative of normal receiving or abnormal receiving of individual a-point to multi-points frames corresponding to each sequence numbers lying between a sequence number, subsequent to a sequence number to be assigned to a latest a-point to multi-points frame in response to which said one slave station has transmitted a response frame previously, and said sequence number assigned to said a-point to multi-points frame in response to which said one slave station decides to transmit said response frame.

13. An a-point to multi-points communication system having a master station for transmitting an a-point to multi-points frame and a plurality of slave stations for receiving said a-point to multi-points frame and for returning response frames in response to said a-point to multi-points frame, said slave stations being divided into a plurality of groups, said master station comprising:

detection means for detecting whether a number of slave stations in each of said groups which transmit said response frame including information indicative of abnormal receiving of said a-point to multi-points frame from said master station is greater than a predetermined value, said number being between zero and a number of all slave stations in each group.

14. An a-point to multi-points communication system according to claim 13, wherein said master station further comprises:

retransmission means for retransmitting, if said detection means detects a group in which the number of slave stations being in abnormal receiving of said a-point to multi-points frame exceeds said predetermined value, said a-point to multi-points frame to said slave stations in said group.

15. An a-point to multi-points communication system according to claim 13, wherein said master station further comprises:

disconnection means for disconnecting, if said detection means detects a group in which the number of slave stations being in abnormal receiving of said a-point to multi-points frame exceeds said predetermined value, a salve station in said group from an object of communication to which said master station transmits said a-point to multi-points frame.

16. An a-point to multi-points communication system according to claim 15, wherein said master station further comprises:

retransmission means for retransmitting, after completion of transmission of a predetermined number of a-point to multi-points frame to slave stations in groups excepting a group disconnected from said object of communication, said predetermined number of a-point to multi-points frames to said slave stations in said group disconnected from said object of communication.

17. An a-point to multi-points communication system having a master station for transmitting an a-point to multi-points frame and a plurality of slave stations for receiving said a-point to multi-points frame and for returning response frames responsive to said a-point to multi-points frame, said slave stations being divided into a plurality of groups, said master station comprising:

detection means for detecting whether the number of slave stations in each of said groups which transmitted a response frame including information indicative of normal receiving of said a-point to multi-points frame from said master station, is less than a predetermined value which is a value between zero and the number of slave stations in each group.

18. An a-point to multi-points communication system according to claim 17, wherein said master station further comprises:
retransmission means for retransmitting, if said detection means detects a group in which the number of slave stations being in normal receiving of said a-point to multi-points frame is less than said predetermined value, said a-point to multi-points frame to slave stations in said group.

19. An a-point to multi-points communication system according to claim 17, wherein said master station further comprises:
disconnection means for disconnecting, if said detection means detects a group in which the number of slave stations being in normal receiving of said a-point to multi-points frame is less than said predetermined value, slave stations in said group from an object of communication to which said master station transmits said a-point to multi-points frame.

20. An a-point to multi-points communication system according to claim 19, wherein said master station further comprises:
retransmission means for retransmitting, after completion of transmission of a predetermined number of a-point to multi-points frames to slave stations in groups excepting a group disconnected from said object of, said predetermined number of a-point to multi-points frames to said slave stations in said group disconnected from said object of communication.

21. An a-point to multi-points communication system having a master station for transmitting an a-point to multi-points frame and a plurality of slave stations for receiving said a-point to multi-points frame and for returning response frames responsive to said a-point to multi-points frame, said slave stations being divided into a plurality of groups, each of said slave stations comprising:
executing a division of a sequence number assigned to said a-point to multi-points frame by a first value (X) which is predetermined at random as being common to all of said slave stations: and
a transmitting means for transmitting a response frame responsive to said a-point to multi-points frame if a residue of said division coincides with a second value Yi, where $0 \leq Yi \leq X-1$ [Yi<X], which is preassigned to said each slave station.

22. An a-point to multi-points communication system according to claim 21, wherein said each slave station further comprises:
inserting means for inserting, in said response frame, information indicative of normal receiving or abnormal receiving of individual a-point to multi-points frames corresponding to sequence numbers lying between a each sequence number, subsequent to a sequence number to be assigned to a latest a-point to multi-points frame in response frame previously, and said sequence number assigned to said a-point to multi-points frame in response to which said one slave station decides to transmit said response frame.

23. An a-point to multi-points communication system having a master station for transmitting an a-point to multi-points frame and a plurality of slave stations for receiving said a-point to multi-points frame and for returning response frames in response to said a-point to multi-points frame, said slave stations being divided into a plurality of groups, each of said slave stations comprising:
executing means for executing a division of a sequence number assigned to said a-point to multi-points frame by a first value (X) which predetermined at random as being in common to all of said slave stations; and
a transmitting means for transmitting a response frame responsive to said a-point to multi-points frame if a residue of said division coincides with a second value Yi, where $0 \leq Yi \leq X-1$ [Yi<X], which is equally predetermined for all slave stations being in a same group.

24. An a-point to multi-points communication system according to claim 23, wherein said each slave station further comprises:
inserting means for inserting, in said response frame, information indicative of normal receiving or abnormal receiving of individual a-point to multi-points frames corresponding to sequence numbers lying between a sequence number lying between a sequence number, subsequent to a sequence number to be assigned to a latest a-point to multi-points frame in response to which said one slave station has transmitted a response frame previously, and said sequence number assigned to said a-point to multi-points frame in response to which said one slave station decides to transmit said response frame.

25. An a-point to multi-points communication system having a master station for transmitting an a-point to multi-points frame and a plurality of slave stations for receiving said a-point to multi-points frame and for returning a response frame responsive to a-point to multi-points frame, each of said slave stations comprising:
responding means for allowing one of said slave stations having at least an a-point to multi-points frame to be transmitted after completion of transmission of said a-point to multi-points frame from said master station to insert in said response frame, information for requesting acquisition of a permission to be a next master station.

26. An a-point to multi-points communication system according to claim 25, wherein said master station comprises:
master station decision means for deciding, in accordance with a predetermined priority rule, said slave station which should act as the next master station if said master station receives said response frame including the information for requesting acquisition of the permission to be a next master station.

27. An a-point to multi-points communication system comprising:
a master station for transmitting an a-point to multi-points frame which includes a sequence number; and
a plurality of slave stations for receiving said a-point to multi-points frame to said master station and for returning response frames each including an indicator for indicating whether said a-point to multi-points frame from said master station is received normally or abnormally by a salve station in response to said received a-point to multi-points frame;

each of said slave stations comprises
memory means for storing an indicator for indicating whether said a-point to multi-points frame from said master station is received normally or abnormally corresponding to said sequence number and for generating said response frame with said indicator, and
returning means for returning a response frame including an indicator in response to said received a-point to multi-points frame.

28. An a-point to multi-points communication system according to claim 27, wherein said each slave station further comprises:
detecting means for detecting whether a difference between said sequence number included in said a-point to multi-points frame and a sequence number included in an a-point to multi-points frame which is received later is two or more; and
said memory means further storing an indicator of abnormal receiving of at least an a-point to multi-points frame which should have a sequence number lying in said difference detected by said detecting means.

29. An a-point to multi-points communication system comprising:
a master station for transmitting an a-point to multi-points frame; and
a plurality of slave stations for receiving said a-point to multi-points frame from said master station and for returning response frames to said master station, in response to said a-point to multi-points frame received from said master station;
said master station comprises
obtaining means for obtaining a receiving status of said a-point to multi-points frame included in said response frames from said slave stations,
classifying means for classifying said receiving status,
selection means for selecting a control content from a retransmission of said a-point to multi-points frame, a transmission of a next a-point to multi-points frame, and a suspension of transmitting, responsive to said classified receiving status.

30. In an a-point to multi-points communication system including a master station for transmitting an a-point to multi-points frame and a plurality of slave stations for receiving said a-point to multi-points frame and returning response frames each including an indicator for indicating to said master station whether said a-point to multi-points frame from said master station is received normally or abnormally by a slave station in response to said received a-point to multi-points frame, said master station comprising:
counting means for counting the number of slave stations which return a response frame including an indicator indicating abnormal receiving of said a-point to multi-points frame;
detecting means for detecting whether the number counted by said counting means is above a predetermined value; and
retransmission means for retransmitting said a-point to multi-points frame if said detecting means detects that the number counted by said counting means is above said predetermined value.

31. A retransmitting method for controlling a master station in an a-point to multi-points communication system including said master station for transmitting an a-point to multi-points frame and a plurality of slave stations for receiving said a-point to multi-points frame and returning response frames each including an indicator for indicating, to said master station, whether said a-point to multi-points frame from said master station is received normally or abnormally by a slave station in response to said received aa-point to multi-points frame, said retransmitting method comprising of:
counting the number of slave stations which returns a response frame including an indicator which indicates abnormal receiving of said a-point to multi-points frame;
detecting whether the number counted in the counting step is above a predetermined value; and
retransmitting said a-point to multi-points frame if said detecting means detects that the number counted in the counting step is above said predetermined value.

32. A method for communication in an a-point to multi-points communication system, said method comprising steps of:
transmitting information from a master station;
receiving said information at a plurality of slave stations;
returning response frames, each including an indicator for indicating to said master station whether said information from said master station is received normally or abnormally at said slave stations in response to said received information;
counting the number of slave stations which returns a response frame including an indicator which indicates abnormal receiving of said a-point to multi-points frame at said master station;
detecting whether the number counted in the counting step is above a predetermined value at said master station; and
retransmitting said a-point to multi-points frame if said detecting means detects that the number counted in the counting step is above said predetermined value at said master station.

* * * * *